United States Patent [19]

Suzuki

[11] Patent Number: 5,270,775
[45] Date of Patent: Dec. 14, 1993

[54] RECORDING APPARATUS MANAGING SYSTEM
[75] Inventor: Nobuyoshi Suzuki, Kanagawa, Japan
[73] Assignee: Fuji Xerox Co., Ltd., Tokyo, Japan
[21] Appl. No.: 832,345
[22] Filed: Feb. 7, 1992
[30] Foreign Application Priority Data Feb. 12, 1991 [JP] Japan .................................. 3-019075

[51] Int. Cl.⁵ ............................................ G03G 21/00
[52] U.S. Cl. .................... 355/204; 355/200; 355/202; 364/403
[58] Field of Search ............... 355/200, 202, 204, 205, 355/206, 208, 209, 210; 364/400, 401, 403; 395/200, 600, 725

[56] References Cited
U.S. PATENT DOCUMENTS

| | | | |
|---|---|---|---|
| 4,497,037 | 1/1985 | Kato et al. | 355/202 X |
| 4,638,428 | 1/1987 | Gemma et al. | 395/725 |
| 4,980,814 | 12/1990 | Hosaka et al. | 364/400 X |
| 5,007,017 | 4/1991 | Kobayashi | 395/200 |
| 5,077,582 | 12/1991 | Kravette et al. | 355/206 |
| 5,130,983 | 7/1992 | Heffner, III | 395/725 X |
| 5,146,344 | 9/1992 | Bennett et al. | 355/202 X |
| 5,181,162 | 1/1993 | Smith et al. | 395/600 X |
| 5,184,179 | 2/1993 | Tarr et al. | 355/206 |
| 5,214,772 | 5/1993 | Weinberger et al. | 355/202 X |
| 5,224,212 | 6/1993 | Rosenthal et al. | 395/600 X |

Primary Examiner—A. T. Grimley
Assistant Examiner—Sandra L. Brasé
Attorney, Agent, or Firm—Finnegan, Henderson, Farabow, Garrett & Dunner

[57] ABSTRACT

A recording apparatus managing system for automatically totalizing and managing the conditions of use of recording apparatuses. When a date of collection of management data is set by a collection-date setting device of a host computer, a determination is made by a holidaypresence-or-absence determining device as to whether or not the collection date falls on a holiday. If it does not fall on a holiday, an automatic collection device is operated on that set day, an instruction for transferring the management data is transmitted from the host computer to a relay apparatus, and the management data held by the relay apparatus is transferred to the host computer. In addition, if it is determined that the set date falls on a holiday, the automatic collection/-transfer device is operated by a setdate automatic changing device on a day other than the holiday, and the management data is automatically collected from the relay apparatus by the host computer. The management data collected from the relay apparatus by the host computer is automatically supplied to a high-order host computer on the date of supply set in advance.

8 Claims, 23 Drawing Sheets

FIG. 8

| DEPT. NO. | | 001 | 002 | 003 | | TOTAL |
|---|---|---|---|---|---|---|
| PAPER SIZE | A0<br>A1<br>.<br>.<br>.<br>B0<br>B1<br>.<br>. | | | | | |
| MODE | B/W<br>FULL COLORS<br>TRACING PAPER<br>.<br>. | | | | | |
| OPTION | BOTH SIDED<br>REDUCED<br>ENLARGED<br>EDITED | | | | | |

FIG. 9

| TERMINAL NO. | | 01 | 02 | 03 | |
|---|---|---|---|---|---|
| PAPER SIZE | A0<br>A1 | | | | |

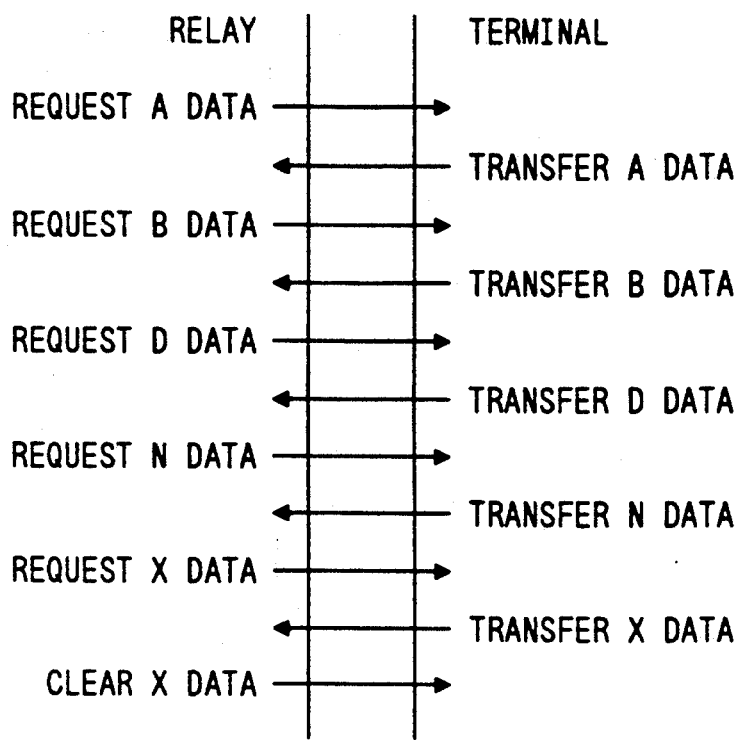
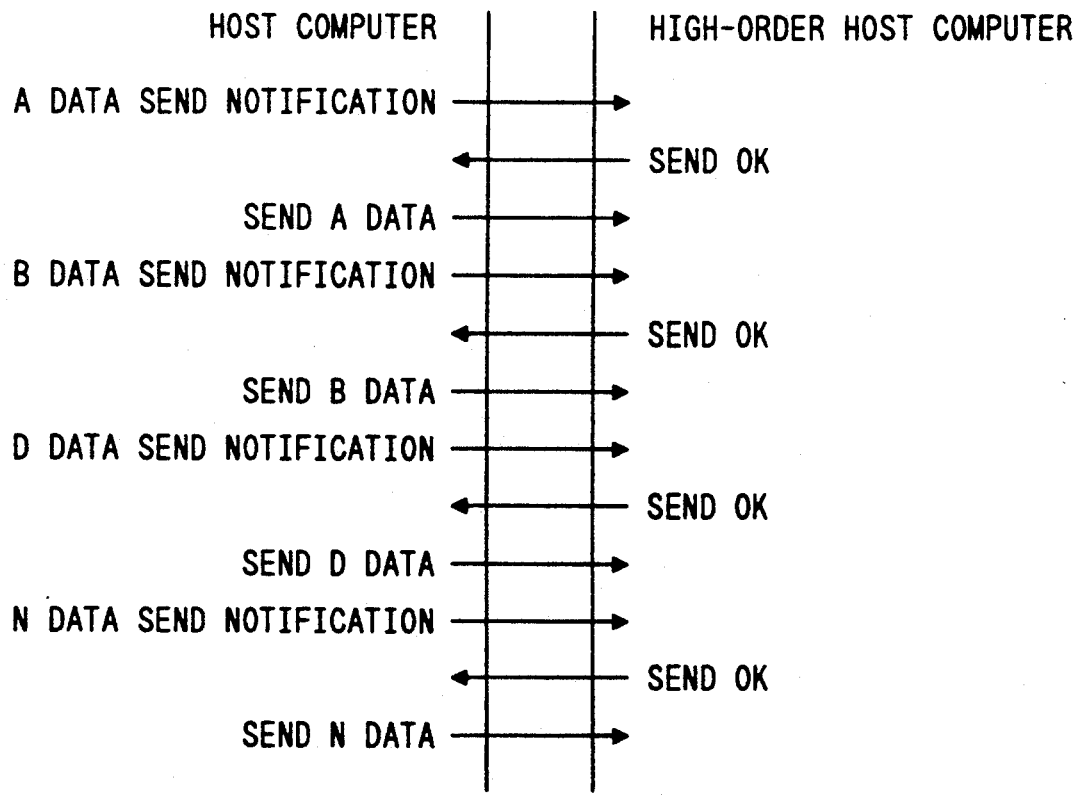

RECORDING APPARATUS MANAGING SYSTEM

BACKGROUND OF THE INVENTION

1. Field of the Invention

The present invention relates to a recording apparatus managing system for automatically totalizing and managing the conditions of use of copying machines, printers, facsimile equipment, and other recording apparatuses used by a plurality of users.

2. Description of the Related Art

In recent years, the present inventors have proposed a recording apparatus managing system comprising: a plurality of managing apparatuses for managing data including information on the use of a plurality of recording apparatuses, such as facsimile equipment, copying machines, and printers, in correspondence with the recording apparatuses; a relay apparatus for accumulating data collected by the managing apparatuses; and a host computer connected to the relay apparatus via a communication line (extension telephone line) and adapted to effect the collection of management data held by the relay apparatus, totalization calculation, calculation of charges, and other processing. In addition, the relay apparatus has the function of automatically outputting a data transfer request to the managing apparatus on a predetermined date and time, and the managing apparatus which receives that data transfer request has the function of transferring stored data corresponding to the content of the request to the relay apparatus. Furthermore, the management data stored in the relay apparatus is transferred to the host computer as a data transfer indication is given from the host computer to the relay apparatus.

However, in a case where the host computer and the relay apparatus are connected via a modem and a public line in the above-described recording apparatus managing system, if the data collection date set in advance in the host computer on the master station's side falls on a holiday on the side of a terminal station equipped with the relay apparatus, there is the possibility that the power sources of the relay apparatus and managing apparatus are turned off. In that case, there has been a problem in that the request of transfer of management data from the host computer to the relay apparatus and the transfer of management data from the relay apparatus to the host computer becomes impossible, and it is impossible to collect management data on the host computer side.

SUMMARY OF THE INVENTION

Accordingly, a primary object of the present invention is to provide a recording apparatus managing system in which, if a date of collection of management data set in a host computer falls on a holiday on the terminal stations' side, the host computer is capable of collecting management data from a relay apparatus by avoiding that holiday.

Another object of the invention is to provide a recording apparatus managing system capable of attaining the above-described primary object and in which the host computer is capable of automatically supplying to a high-order host computer the management data which the host computer collected from the relay apparatus.

To attain the above-described and other objects of the present invention, there is provided a recording apparatus managing system comprising: at least one terminal station including managing means for managing data including information as to the use of a plurality of recording means installed on the terminal station, and a relay means connected to the managing means to collect and hold the management data from the managing means at a set time; and a master station including a first host operation means connected respectively to the relay means through a data network to effect data processing, the first host operation means including collection-date setting means for setting a date of collection of the management data held by the relay means, automatic collection means for automatically collecting the management data held by said relay means on the collection day set in advance by the collection-date setting means, means for determining whether the set date falls on a predetermined day, and means for operating the automatic collecting means on a day other than the predetermined day in response to an output of the determining means.

According to the invention, when a date of collection of management data is set by the collection-date setting means of the host computer, a determination is made by the determining means as to whether or not the collection date falls on a holiday. If it does not fall on a holiday, the automatic collection means is operated on that set day, an instruction for transferring the management data is transmitted from the host computer to the relay apparatus, and the management data held by the relay apparatus is transferred to the host computer. In addition, if it is determined that the set date falls on a holiday, the automatic collection/transfer means is operated by the set-date automatic changing means on a day other than the holiday, and the management data is automatically collected from the relay apparatus by the host computer.

In addition, in accordance with the invention, the management data collected from the relay apparatus by the host computer is automatically supplied to the high-order host computer on the date of supply set in advance.

The above and other objects, features and advantages of the present invention will become more apparent from the following detailed description of the invention when read in conjunction with the accompanying drawings.

BRIEF DESCRIPTION OF THE DRAWINGS

In the accompanying drawings:

FIG. 8 is a diagram illustrating an example of the format of management data;

FIG. 9 is a diagram illustrating another example of the format of management data;

FIG. 13 is a diagram illustrating a method of transferring data between the relay apparatus and terminal equipment;

FIG. 15 is a diagram illustrating a method of transferring data between the host computer and a high-order host computer;

DESCRIPTION OF THE PREFERRED EMBODIMENTS

Referring now to the accompanying drawings, a description will be given of an embodiment of the present invention which is implemented as a copying-machines managing system.

Figure 1:
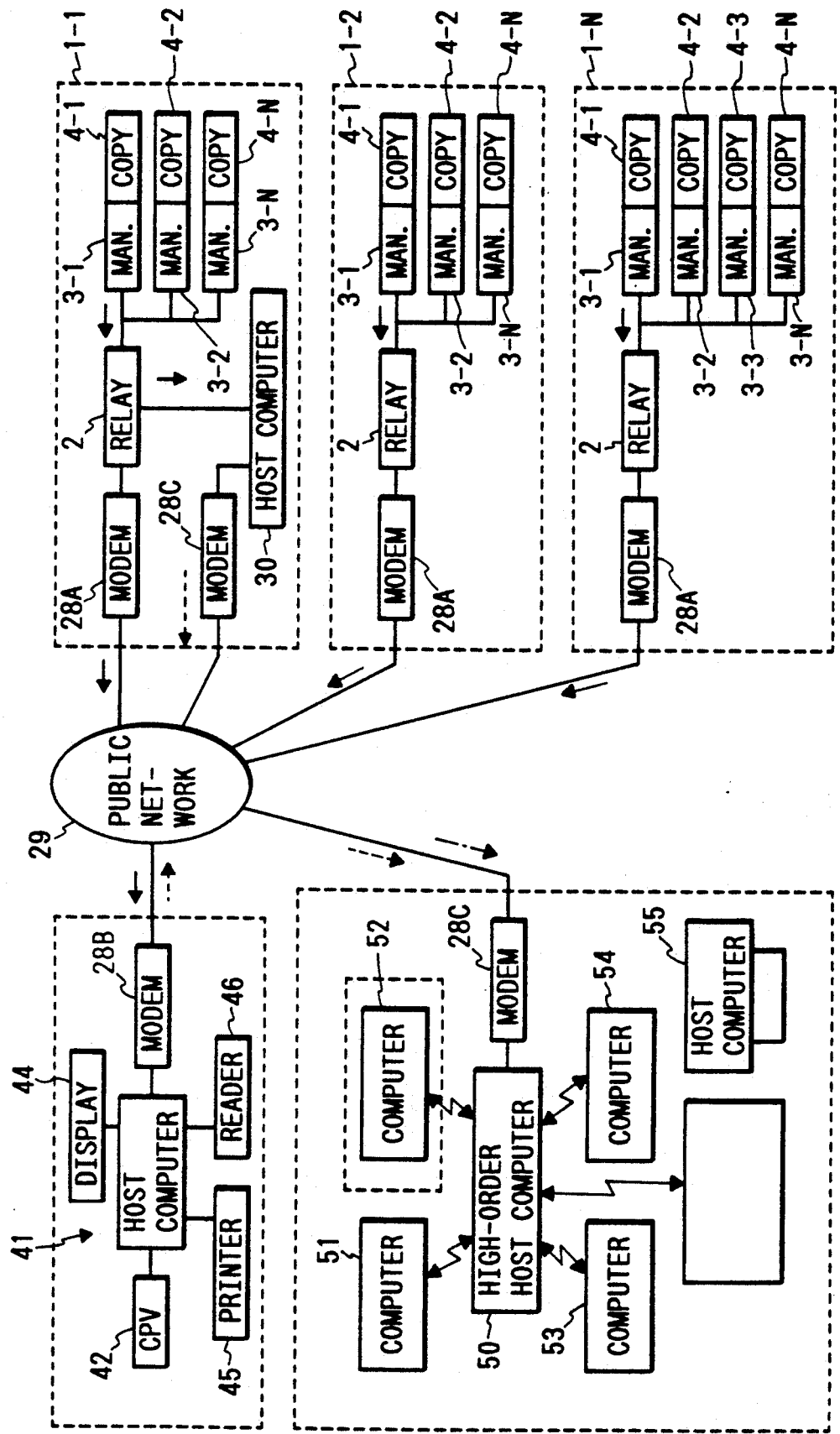
FIG. 1 is a block diagram of a recording apparatus managing system in accordance with an embodiment of the present invention.
Figure 2:
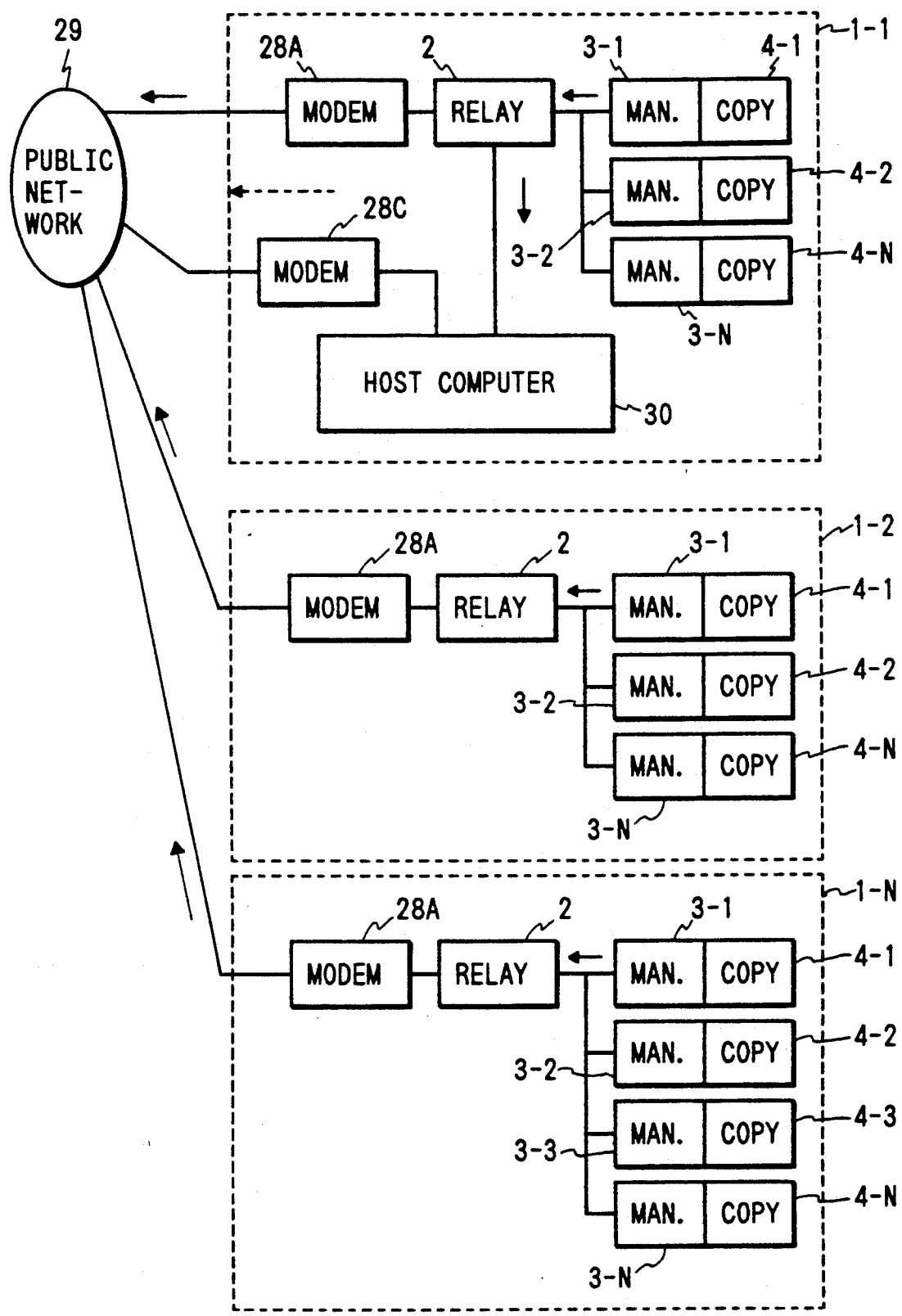
FIG. 2 is a block diagram of apparatuses installed on the terminal stations' side.
Figure 3:
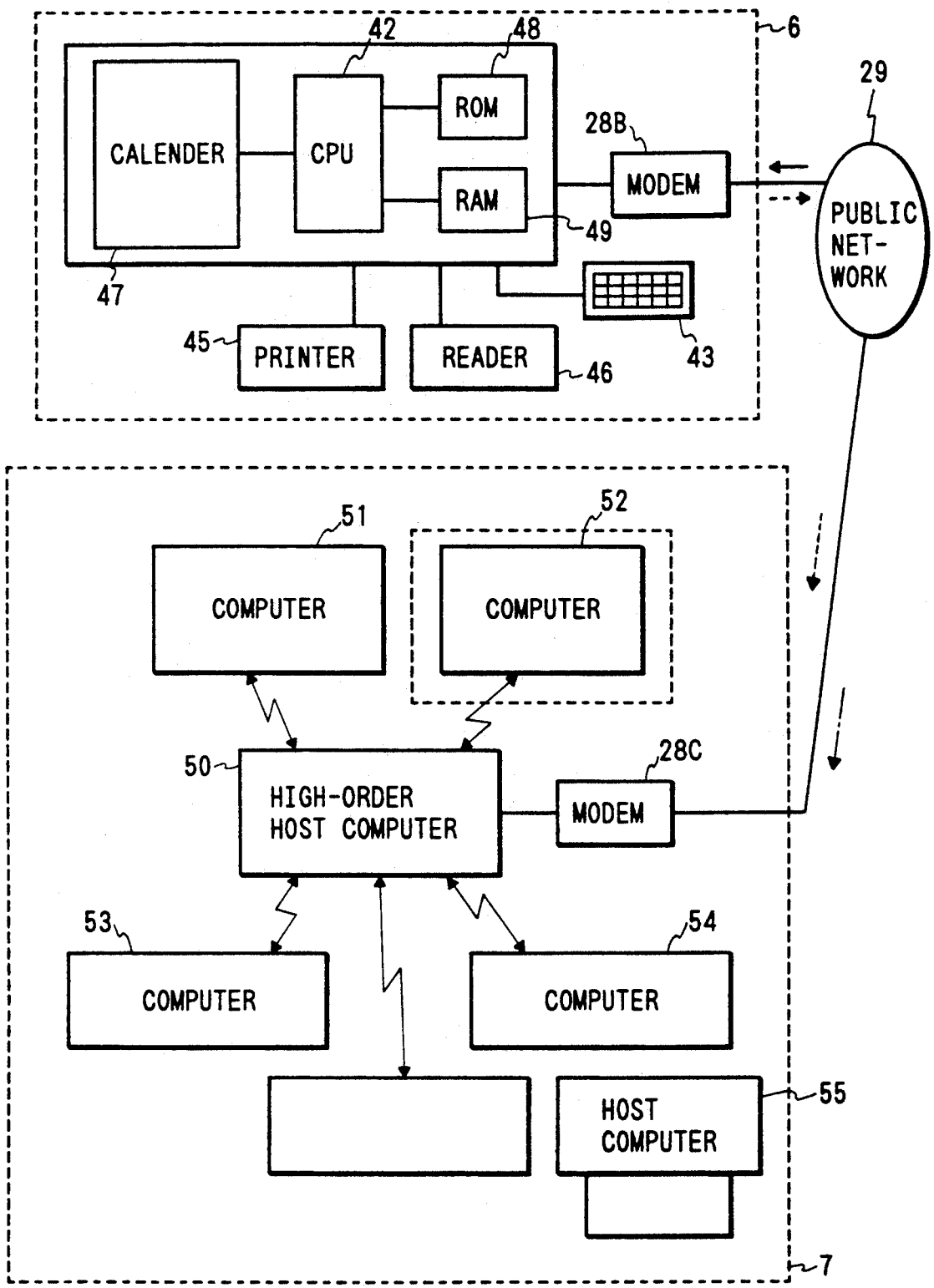
FIG. 3 is a block diagram of apparatuses installed on the master station's side.

FIG. 1 is a block diagram illustrating an overall managing system in accordance with the embodiment. FIG. 2 is a block diagram illustrating configurations of hardware installed in various offices (on the terminal stations' side). FIG. 3 is a block diagram illustrating configurations of hardware installed in the operation headquarters (on the master station's side) for controlling the plurality of offices and in a head office for controlling a plurality of the operation headquarters.

In FIG. 1, copying machines 4-1 to 4-N, i.e., a plurality of recording apparatuses respectively installed in a plurality of offices 1-1 to 1-N in necessary numbers, are used to copy documents, images, photographs, and the like on paper. Meanwhile, managing apparatuses 3-1 to 3-N are used to set the copying machines 4-1 to 4-N in the usable state by reading registration numbers (registration codes) of such as department information written in a recording medium such as a copy card, classify and totalize information on the use thereof for each registration number, and store the same.

In the case of the copying machines, the information on use includes the following: department account data A; charge data B based on count meters of copying machines; physical distribution data D on the number of copies made per type of paper in each copying machine; maintenance data N on such as the number of toner replenishment, the number of jamming, the starting time and ending time of use for each day, and the number of operations; and data X representing the conditions of use such as data totalizing the amounts of the conditions of use including the details of use for each copying operation, i.e., the paper size, the use of black-and-white, full-color, black-and-white tracing paper, or monocolor printing, as well as the type of copy mode, optional functions such as the double-sided/multiplex copying, plate making for a printing machine, reduced copy, edited or synthesized copy, and the like. These items of information are, of course, selected depending on the kind of information required in accordance with the purpose of management, but are also restricted depending on the data storage capacities of the managing apparatuses 3-1 to 3-N. In addition, in the light of budgets or the like of the offices, for instance, managing apparatuses capable of collecting all kinds of data A, B, D, N, and X mentioned above are used in the office 1-1 shown in FIG. 2, while managing apparatuses capable of collecting only three kinds of data B, D, and N are used in the office 1-2. Furthermore, the above-described two kinds of apparatuses are used in mixed form in the office 1-N.

Figure 4:
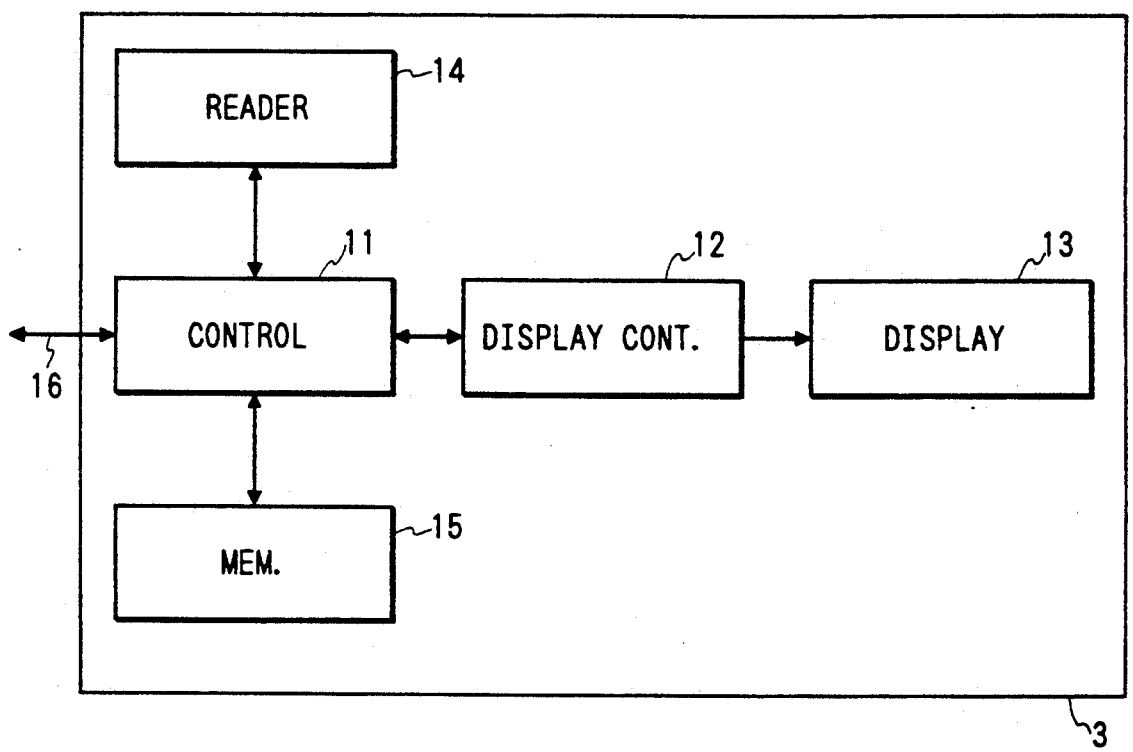
FIG. 4 is a block diagram of a copying-machines managing apparatus.

Referring now to FIG. 4, a description will be given of a configuration of a managing apparatus 3.

A control unit 11 is connected to a copying machine 4 and is also connected to a relay apparatus 2 via a line 16. When a copy card has been set in a reader 14, the control unit 11 reads a copy number written in that copy card, and if it is a registered copy number, the control unit 11 sets the copying machine in a state of being capable of copying. If copying has been effected, the control unit 11 fetches various items of data, such as the number of copies made, from the copying machine, adds the same to the data on the number of copies made so far for that department, and stores its aggregate total in a memory 15. When a totalization card constituted by a magnetic card or the like has been set in the reader 14, the control unit 11 fetches data, such as the number of copies made, which is stored in the memory 15, and the control unit 11 consecutively displays the data such as the number of copies with respect to each item on a display 13 via a display controller 12.

Figure 5:
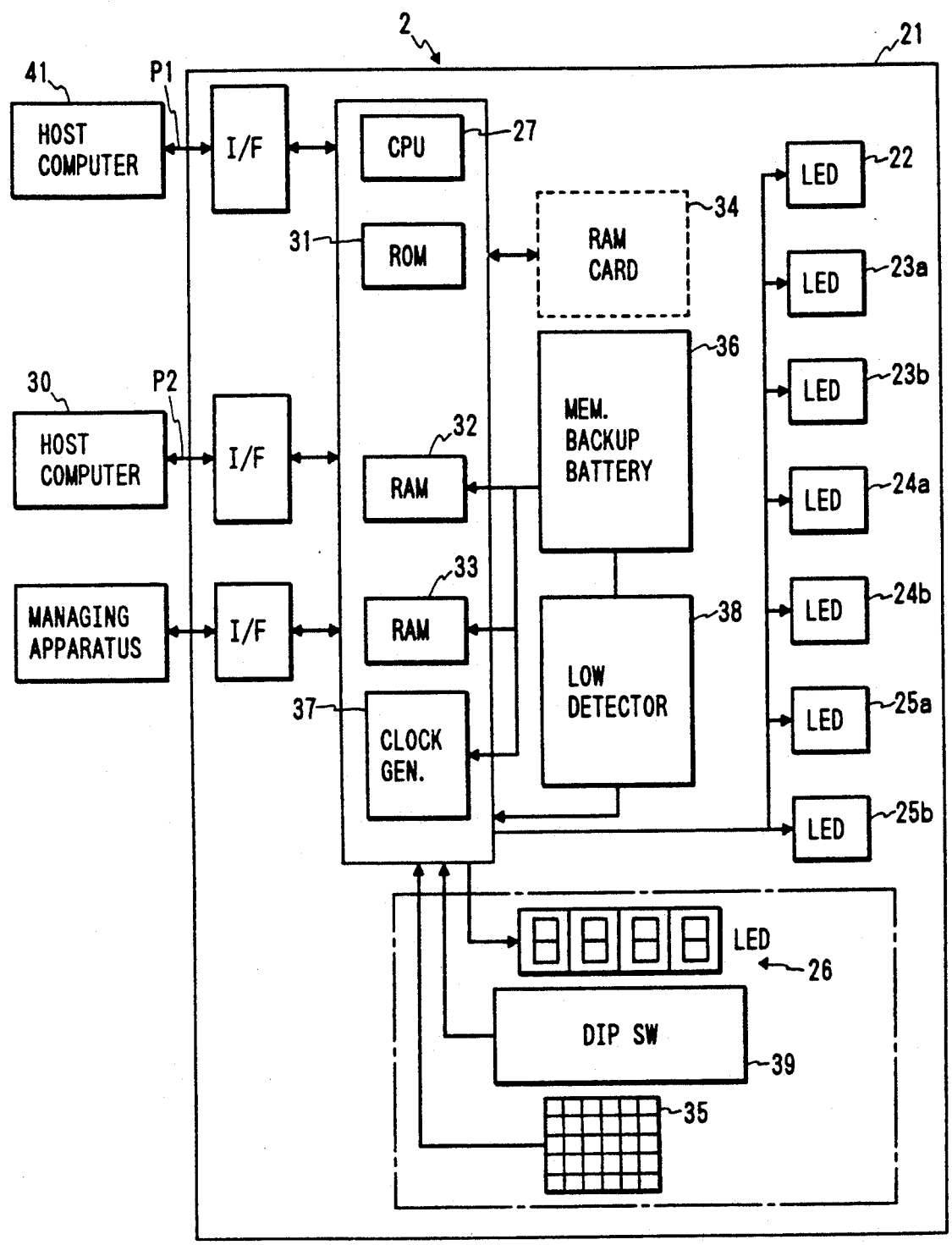
FIG. 5 is a block diagram of a relay apparatus.

Referring now to FIG. 5, a description will be given of the relay apparatus 2.

A red LED 22 for displaying the turning on and off of a power source and green LEDs 23a, 23b, 24a, 24b, 25a, and 25b for displaying transmission to and reception by a port P1, a port P2, and the managing apparatus (hereinafter also referred to as the terminal equipment) are provided on the front surface of a body case 21 of the relay apparatus 2. Connection terminals for the port P1, the port P2, and the terminal equipment are provided on the rear surface of the body case 21. Furthermore, an upper cover is detachably provided on the body case 21, and an LED display 26 for displaying in four digits with seven segments is provided in the body case 21.

A description will be given of an electrical configuration of the relay apparatus 2. A central processing unit (CPU) 27 has a communication function, data-collecting and computing functions, and a clock-generating (counting) function. The connection terminal for the port P1 is connected to a host computer 41 (which will be described later) installed in the operation headquarters 6 via a modem 28A, a public line 29, and a modem 28B, as shown in FIG. 1. In addition, the central processing unit (CPU) 27 is connected to the managing apparatuses 3-1 to 3-N via the connection terminal for the terminal equipment, and is adapted to relay management data with respect to the plurality of managing apparatuses 3-1 to 3-N which it controls. Connected to the terminal for the port P2 is a copy-management-system host computer 30 for collecting the department account data A and the charge data B in the office 1-1, for instance, as required, and communication is possible between them. This host computer 30 collects the data A and B from the copying machines 4 in the office, totalizes the number of copies used by specific departments, for example, and effects transfer processing of charges. More specifically, the host computer 30 conducts daily totalization, monthly totalization, and the like, calculates charges for each department, issues bills, and prepares statistical data for analyzing the utilization rate and other conditions of use for each terminal equipment. This host computer 30 is capable of transferring the totalized data to the host computer 41 via a modem 28C, the public line 29, and the modem 28B. In addition, the host computer 30 has a keyboard and a means for reading such as a floppy disk (FD) or a memory card, and data on departments, managing apparatuses 3, and the like from which data cannot be collected on an online basis is also inputted thereto through the FD, memory card, tape, keyboard, or the like, and that data is also processed in a similar manner.

A control program for controlling the CPU 27 is stored in a read-only memory (ROM) 31 of the relay apparatus 2 shown in FIG. 5. A random-access memory (RAM) 32 is for storing and retaining data transmitted from the managing apparatus 3 and has a predetermined memory capacity. An extension connector for an extension RAM board is provided on a main substrate in the body case 21, and the storage capacity of the RAM 32 can be increased by connecting an extension RAM board 33 to that extension connector so as to increase the number of units of managing apparatus under their control.

Furthermore, the relay apparatus 2 is provided with an extension connector for a RAM card, so that a RAM card 34 can be connected thereto. The RAM card 34 has a storage capacity corresponding to the case where the aforementioned extension RAM board 33 is connected. When the CPU 27 has collected management data from the plurality of managing apparatuses 3-1 to 3-N under its control, the CPU 27 writes that data in the RAM 32 (including the extension RAM board 33 if that extension RAM board 33 is mounted) and also saves that data in the RAM card 34.

The saving of data in the RAM card 34 is also possible by operating entry keys 35 so as to load the management data stored in the RAM 32 (including the extension RAM board 33 if that extension RAM board is mounted) into the RAM card 34. Conversely, the reverse loading of the management data on the managing apparatuses 3-1 to 3-N stored in the RAM card 34 into the RAM 32 (including the extension RAM board 33 if that extension RAM board 33 is mounted) is possible by the operation of the entry keys 35.

A memory backup battery 36 is used for maintaining the storage and retention operation of the RAM 32 and the extension RAM board 33 as well as the operation of a clock generator 37 at the time when the power source is turned off. A LOW battery detecting unit 38 detects the voltage of the memory backup battery 36, and when that voltage has dropped below a predetermined voltage value, the CPU 27 causes the LED display 26 to display a voltage drop message in response to a signal from the LOW battery detecting unit 38.

Dip switches 39 are used to provide various settings including the setting of transmission speeds of apparatuses connected via the port P1, the port P2, and the connection terminal for the terminal equipment, setting of the kind of apparatuses connected to the respective ports, setting of a monitor output, setting of reverse loading with respect to the RAM card 34, setting of the standard mode or extension mode for the memory capacity, setting of the presence or absence of the RAM card, setting of the entry key input mode, and changeover of the setting of display on the LED display 26 such as a communication command, a terminal number, and an error code. The entry keys 35 are provided integrally with the relay apparatus 2, and has a numeric keypad, an input confirmation key, and a clear key. It should be noted that the entry keys 35 may be provided separately from the relay apparatus 2.

The operator can enter a predetermined number of (e.g., six) times of polling time a day by operating the entry key 35 or by operating both the entry key 35 and the dip switch 39. In addition, by operating the entry key 35, the operator can designate the terminal number for which data is to be collected and the kind of data to be collected in the designated terminal. On the basis of a menu thus set, the CPU 27 consecutively outputs a polling signal to the managing apparatuses 3 of the set terminal numbers under its control at each set time, and collects necessary data and totalizes the same.

In a case where the setting of display of the communication command, the terminal number, and the error code on the LED display 26 has been effected by means of the dip switches 39, communication is effected properly with another apparatus via the connection terminals for the port P1, the port P2 and the terminal equipment, and the CPU 27 displays the command number at the two high-order digits of the four-digit LED display 26 on the basis of the command number for which communication is presently being carried out, and displays at two low-order digits the port P1 or the port P2 being used for communication, or the terminal number for which the communication is being effected.

The relay apparatus 2 arranged as described above issues a polling signal or the like at preset or indicated time, connects a communication line, consecutively collects and retains totalized data from the respective managing apparatuses 3-1 to 3-N, and transfers the same to the host computer 41. In an office where the copy management system computer 30 is installed, the data A and B are also transferred from the relay apparatus 2 to the computer 30. In addition, the managing apparatuses 3-1 to 3-N are respectively provided with terminal numbers, and the respective managing apparatuses 3-1 to 3-N store the totalized data for each registration number, so that the relay apparatus 2 has data collected for each terminal number and for each registration number. However, it suffices if the relay apparatus 2, for its part, retains data in units of registration numbers in which data on the same registration number has been totalized with respect to the data of the respective terminal number. That is, in this system, one recording medium is capable of accessing the respective managing apparatuses 3-1 to 3-N, and the data of the same registration number is totalized by the relay apparatus 2.

Referring now to FIG. 3, a description will be given of the host computer 41 installed in a company (master station's side) and connected to the above-described relay apparatus 2 via the modems 28A, 28B, and the public line 29.

This host computer 41 comprises the following: a central processing unit (CPU) 42 equipped with the communication function, data-collecting and computing functions, and the clock-generating (counting) function; a read-only memory (ROM) 48 in which a control program and the like for controlling the CPU 42 are stored; a random-access memory (RAM) 49 having a predetermined memory capacity for storing and retaining the data transferred from the relay apparatus 2; a keyboard 43 for inputting various data such as the registration numbers of the relay apparatuses under its control and from which data is to be collected; a display 44; a printer 45; a reader 46, and the like. The host computer 41 directly fetches various management data from the relay apparatuses 2 connected thereto via the public line 29 and the modems 28A, 28B, and conducts various data processing including totalization which will be described later. The fetching of management data from the relay apparatuses 2 is conducted with a relatively long time interval such as once a day, once a week, or once a month, for example.

The keyboard 43 has a numeric keypad, an input confirmation key, a function key, and a clear key, and together with the CPU 42, ROM 48, and RAM 49 constitutes a collection-date setting means for designating the date and time of collection of the management data stored in the relay apparatuses 2 and is capable of inputting a day of the week corresponding to the collection date. In addition, the CPU 42 has a calendar table 47 constituting a holiday-presence-or-absence determining means for determining whether or not the aforementioned set date (day of the week) falls on a holiday. The arrangement provided is such that the CPU 42 compares information on a calendar (holidays and work days) peculiar to the office and stored in the calendar table 47 with the collection date (day of the week) set by the keyboard 43. If it is determined that it does not fall on a holiday, the CPU 42 automatically collects data from the relay apparatus 2 on the set date of collection of data, and supplies the collected data to a high-order host computer 50 which will be described later. On the other hand, if it is determined by the CPU 42 that the set date falls on a holiday, in this embodiment, the set date is automatically changed to an immediately preceding date by the CPU 42 which also serves as a set-date automatically changing means for changing a set date to a day other than a holiday. On the changed day of collection, the host computer 41 collects data from the relay apparatus 2, and supplies this collected data to the high-order host computer 50. The supply of data to the high-order host computer 50 is effected on the day of supply set by the keyboard 43 which also serves as a supply-date setting means.

A description will now be given of the totalization processing of management data in the host computer 41.

Figure 6:
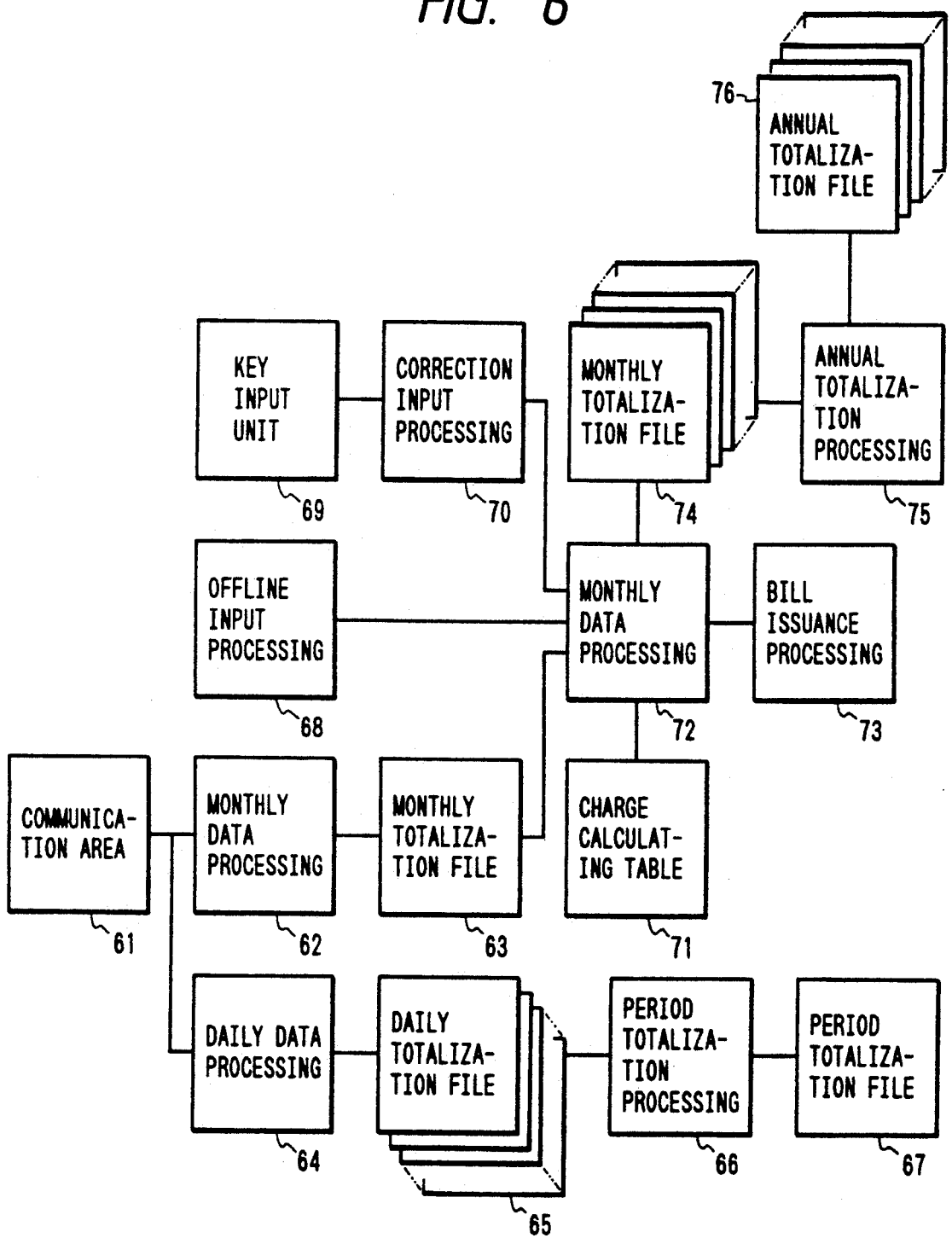
FIG. 6 is a diagram illustrating totalization processing by a host computer.

FIG. 6 is a diagram illustrating an example of the configuration of a totalization processing system which comprises the following: a communication area 61; a monthly data processing unit 62; monthly totalization files 63; a daily data processing unit 64; daily totalization files 65; a period totalization processing unit 66; a period totalization file 67; an offline input processing unit 68; a key input unit 69; a correction input processing unit 70; a charge calculating table 71; a monthly data processing unit 72; a bill issuance processing unit 73; monthly totalization files 74; an annual totalization processing unit 75; and annual totalization files 76.

The communication area 61 is an area in which the management data collected by communication with the relay apparatus 2 is written. Since the host computer 41 daily collects the management data totalized in the storage means (RAM 32) of the relay apparatus from the beginning of a month, as described above, that management data is written in the communication area 61. The monthly data processing unit 62 effects processing for rewriting the monthly totalization file 63 with the management data written in the communication area 61, while the daily data processing unit 64 obtains the daily totalization file 65 by subtracting the previous management data from the management data written in the communication area 61. Accordingly, the monthly totalization file 63 is daily updated by the management data stored in the communication area 61 until the end of a month, while the daily totalization file 65 accumulates daily totalized data each month from the first day to a final day, i.e., data on 31 days. If a period of, for instance, one week from x day to y day has been designated, the period totalization processing unit 66 reads the daily totalization files 65 for that period of x day to y day and effects totalization processing, so as to obtain the period totalization file 67. It should be noted that, with respect to management items having cumulative data in units of particular periods such as particular weeks or months in the managing apparatus, data is collected and totalization processing is effected for each of such periods.

The monthly data processing unit 72 processes data on a month at the end of that month, calculates charges, and prepares the monthly totalization file 74, while the bill issuance processing unit 73 prepares and issues bills for each department in accordance with the result of calculation by the monthly data processing unit 72. Unit prices of the respective units of terminal equipment and items are set in the charge calculating table 71. The monthly totalization files 74 store a 24-months portion of the monthly totalized data for each terminal equipment and department, while the annual totalization processing unit 75 reads each monthly management data from each monthly totalization file 74 and totalizes for each terminal equipment and department the number of copies made per annum, the number of copies made for each month, changes for each month over the preceding year, values, and the like. As for this totalized data, data for, for example, two years is stored in the annual totalization files 76.

The online input processing unit 68 inputs management data of a managing apparatus which is not connected online to this system, and is used to effect input processing of a FD, memory card, or tape on which management data is recorded after being read from the managing apparatus. Since such management data is processed in monthly units, such management data is totalized and processed together with the monthly totalization file 73 collected online after being inputted to the monthly data processing unit 72. In addition, the key input unit 69 and the correction input unit 70 are used to input and process data requiring correction processing.

A description will now be given of the high-order host computer 50 connected to the host computer 41 via the public line 29 and the modems 28B, 28C.

As shown in FIG. 3, the high-order host computer 50 collectively controls the data provided by the plurality of host computers 41 under its control, and has a large-capacity storage means, and data for each office is stored therein in classified form. In addition, computers 51-54 having various functions of charging, making arrangements for expendables, and the like using this data are connected to the high-order host computer 50. A host computer 55 capable of providing the data X through the floppy disk FD is also connected to the high-order host computer 50.

A description will now be given of the operation of a copying-machines managing system arranged as described above.

Figure 7:
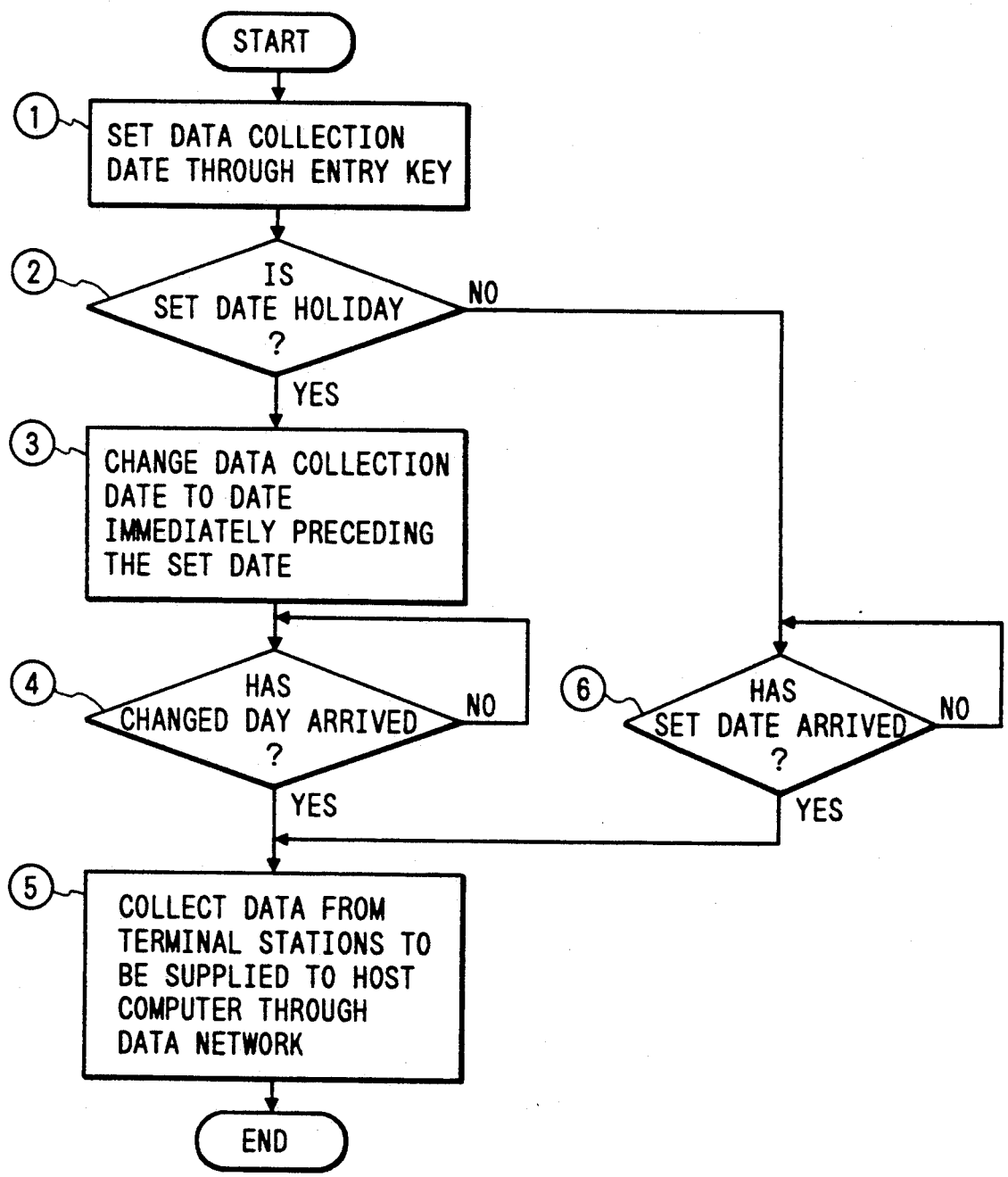
FIG. 7 is a flowchart illustrating an outline of totalization operation.

Referring first to FIG. 7, a description will be given of an outline of the operation which constitutes a gist of the present invention.

In Step 1 in FIG. 7 (each step being indicated by being encircled in the flowchart), the entry key on the keyboard 43 of the host computer 41 is operated by the operator, the data of collection (day of the week) is set by the CPU 42, and the time of collection thereof is also set as final time of that day, for example. Then, in Step 2, a comparison is made by the CPU 42 between the collection date thus set and calendar (holidays and work days) information for each office stored in advance in the calendar table 47. If the set collection date falls on a holiday, in Step 3, the set collection date is changed to an immediately preceding date by the CPU 42. Subsequently, in Step 4, a determination is made by the CPU 42 as to whether or not the post-change set collection day has arrived, and if YES is the answer, the host computer 41 collects management data from the relay apparatus 2. This collection data is totalized for each office and terminal equipment. Subsequently, when the date of supply set in advance by the entry key on the keyboard 43 has arrived, that totalized data is supplied from the host computer 41 to the high-order host computer 50.

It should be noted that although different dates may be set as the date of collection of data from the relay apparatus and the date of supply of data to the host computer, the date of supply of data should preferably follow the date of collection of data.

Meanwhile, if it is determined in Step 2 in FIG. 7 that the set date of collection of data does not fall on a holiday, a determination is made in Step 6 as to whether or not the initially set date of collection has arrived. If YES is the answer, the operation proceeds to Step 5, and the host computer 41 collects management data from the relay apparatus 2.

It should be noted that although in this embodiment the set date is changed to a date immediately preceding a holiday, it may be changed to a date immediately following the holiday. In that case, it is preferable to collect the data at the earliest time in the morning.

In addition, if the host computer 41 is provided with the calendar information for each office, in a case where there are many changes due to holidays, the updating operation becomes very troublesome. In this case, it suffices if the relay apparatus 2 is provided with the function of managing the collection dates, as will be described below. In this case as well, the operation is effected in the manner illustrated in FIG. 7 in the same way as in the above-described embodiment. However, the setting of the calendar table is effected by using the entry key 35 on the relay apparatus 2 side. After making a determination concerning the set date and the changed date, the CPU 27 collects data from the terminal equipment and requests the host computer 41 to transfer data, and the host computer 41, upon receiving the same, collects data from the relay apparatus 2. In addition, holidays in the calendar table 47 of the host computer 41 may be set by using the entry key 35 of the relay apparatus 2.

As for the management data, data transfer is executed a plurality of times a day between the relay apparatus 2 and each managing apparatus 3, as described before, and management data for one day is stored in the relay apparatus 2. Data transfer is executed every day between the host computer 41 and the relay apparatus 2. Basically speaking, Data transfer requests are consecutively issued from a high-order apparatus to a low-order apparatus, and data transfer is executed from the low-order apparatus to the high-order apparatus in response to the same. Then, upon confirming the receipt of data, each apparatus issues a clear indication, and clear processing is executed upon receipt of the same. In that case, in the event that a special circumstance has arisen such as abnormality or repair of the low-order apparatus, it suffices if an interrupt request is issued from the low-order apparatus to the high-order apparatus so as to effect data transfer urgently.

A detailed description will now be given of the data transfer request among the high-order host computer 50, the host computer 41, the relay apparatus 2, and the managing apparatus (terminal equipment) 3, data transfer operation thereof, and the management data collecting operation of the managing apparatus 3 itself.

The management data is integrated for each type of paper size, mode, and option with respect to the department number of a registration code, e.g., "001-999," as shown in FIG. 8, and is stored in the storage means of the managing apparatus. For instance, when the managing apparatus 3 reads the registration code of Department No. "001" and gives a permission to operate to the copying machine, and information on the fact that 10 sheets with A4 paper size, black-and-white, on a reduced scale have been used is sent thereto from the copying machine in response to it, the managing apparatus 3 adds that number of sheets to the data in the storage area to which Department No. "001" corresponds, so as to update the contents of the storage area. Then, if a data transfer request is made from the relay apparatus 2, the managing apparatus 3 transfers the contents, and if a clear indication is given thereto, the managing apparatus 3 effects clear processing by writing zeros in that area. Meanwhile, also stored in the relay apparatus 2 are management data for each department number as shown in FIG. 8 and management data for each terminal number as shown in FIG. 9. The management data for each terminal number represents the number of sheets in the column for total, shown in FIG. 8, in the management data of the managing apparatus.

Figure 10:
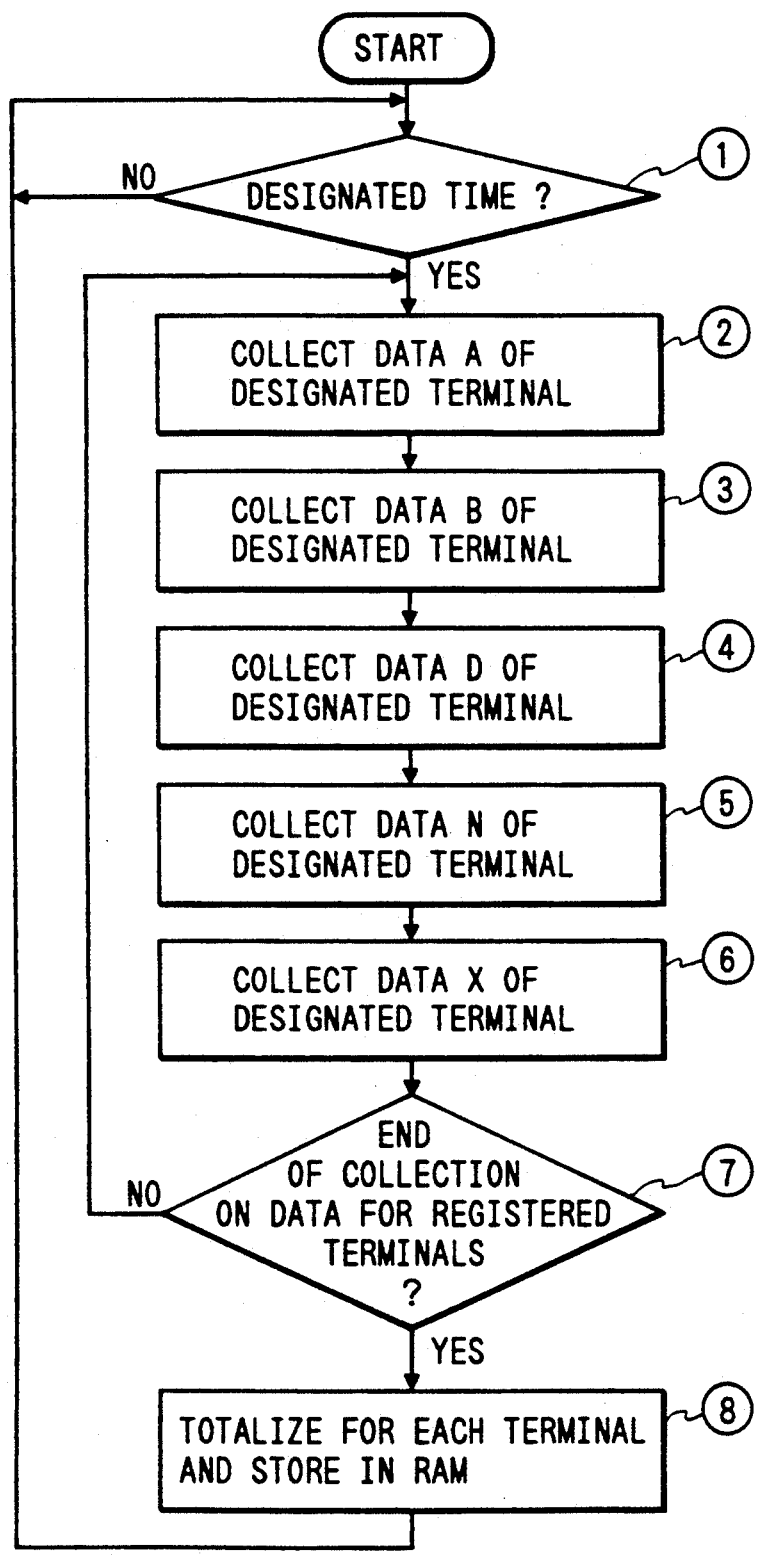
FIG. 10 is a flowchart illustrating a method of collecting data.

Referring now to FIG. 10, a description will be given of the operation taking place between the relay apparatus 2 and the managing apparatuses 3-1 to 3-N.

In Step 1 in FIG. 10, a determination is made by the CPU 27 of the relay apparatus 2 as to whether or not the designated time has arrived. If YES is the answer, the data A of the designated terminal equipment are collected in Step 2. In subsequent Steps 3 to 6, the data B, data D, data N, and data X of the designated terminal equipment are sequentially collected. Then, in Step 7, a determination is made by the CPU 27 as to whether or not the collection of data of all the registered terminal equipment has been completed. If NO is the answer, the processing returns to Step 2, while if YES is the answer, data is totalized for each terminal equipment and is stored in the RAM 32 of the relay apparatus 2. Subsequently, the processing proceeds to the operation of determining the designated time.

Figure 11:
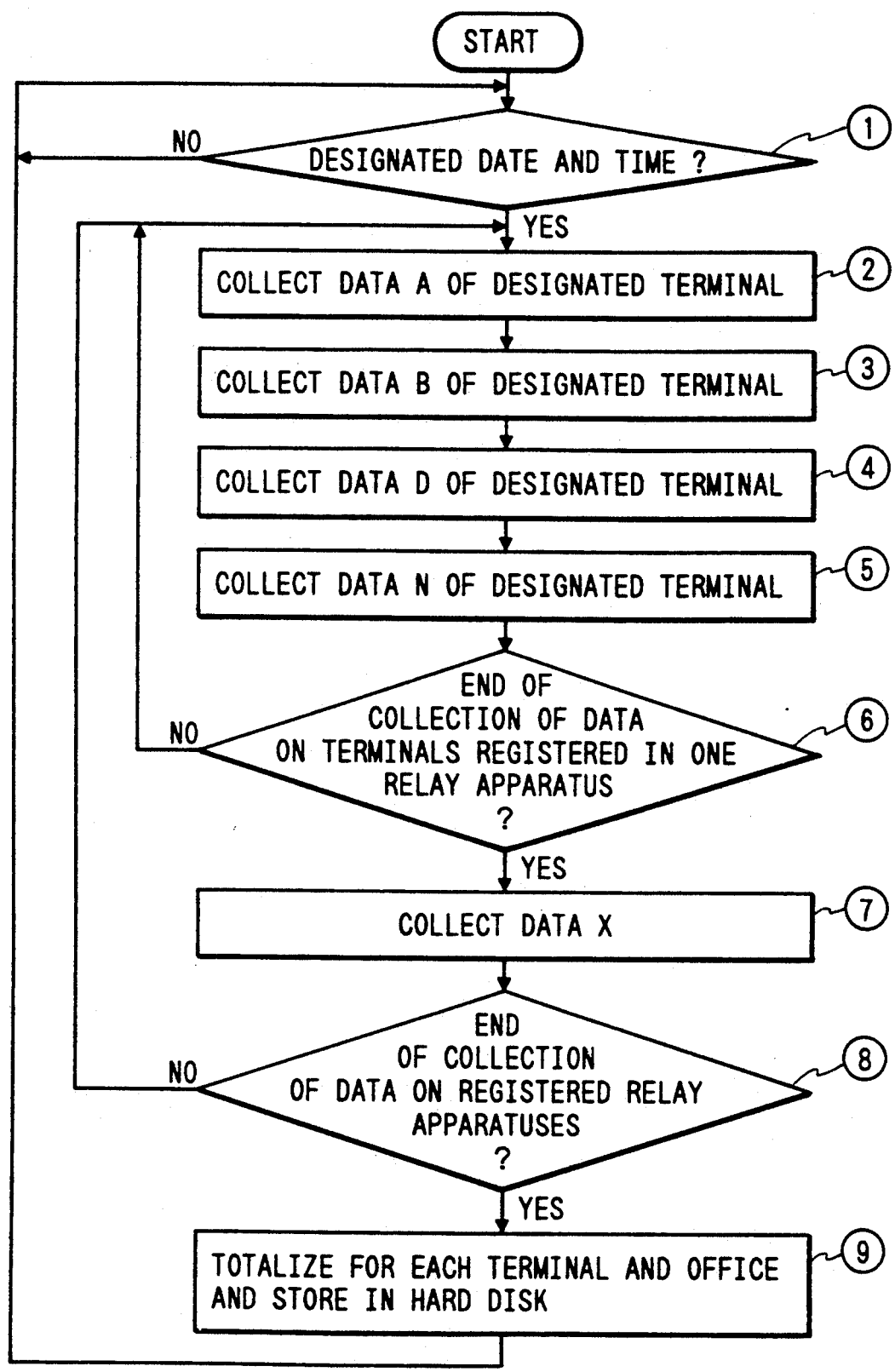
FIG. 11 is a flowchart illustrating another method of collecting data.

Referring now to FIG. 11, a description will be given of the operation taking place between the host computer 41 and the relay apparatus 2.

In Step 1 in FIG. 11, a determination is made by the host computer 41 as to whether or not the collection date and time have arrived. If YES is the answer, the data A of the designated terminal equipment are collected in Step 2. In subsequent Steps 3 to 5, the data B, data D, and data N of the designated terminal equipment are sequentially collected. Then, in Step 6, a determination is made by the host computer 41 as to whether or not the collection of data of all the terminal equipment registered in the relay apparatus 2 has been completed. If YES is the answer, data is totalized for each office and terminal equipment and is stored in the RAM 49 of the host computer 41.

Figure 12:
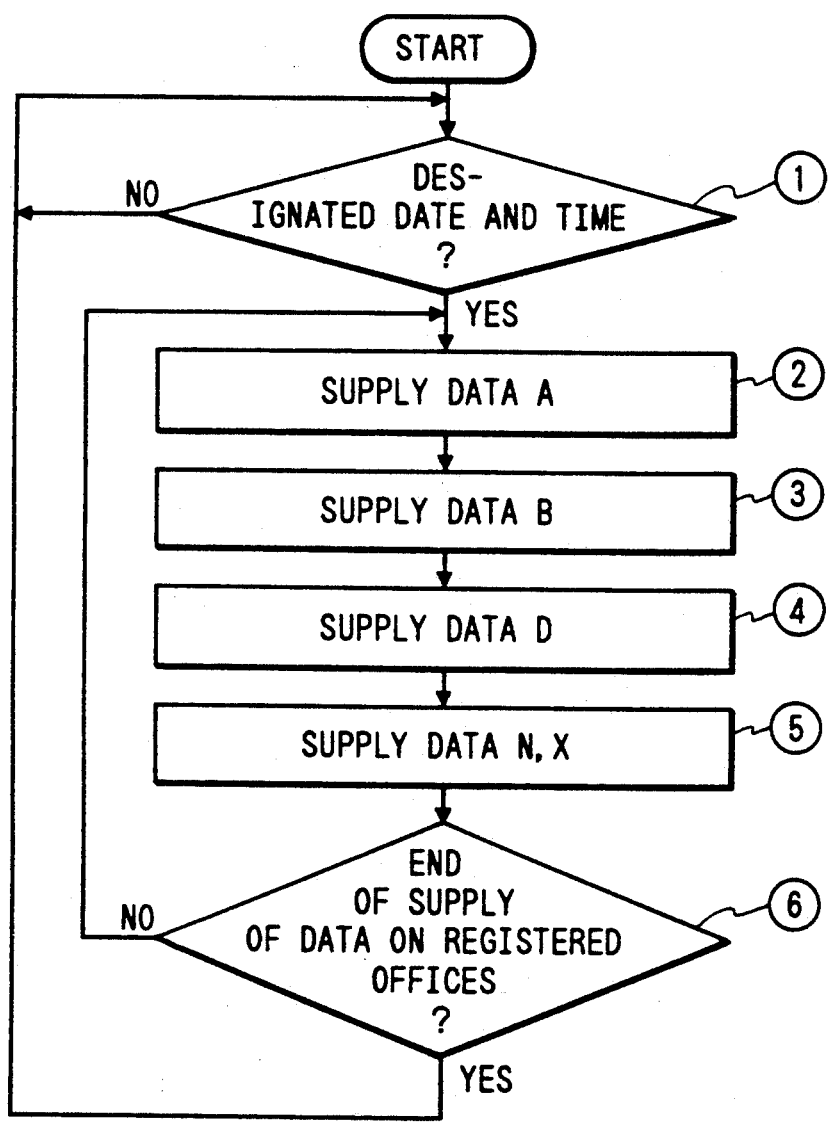
FIG. 12 is a flowchart illustrating still another method of collecting data.

Referring now to FIG. 12, a description will be given of the operation taking place between the host computer 41 and the high-order host computer 50.

In Step 1 in FIG. 12, a determination is made by the host computer 41 as to whether or not a designated (supply) date and time set in advance have arrived. If YES is the answer, the data A are supplied to the high-order host computer 50 in Step 2. Thereafter, in Steps 3 to 5, the data B, data D, data N, and data X are sequentially supplied. Then, in Step 6, a determination is made by the CPU 42 as to whether or not the supply of data of all the registered offices has been completed. If NO is the answer, the processing returns to the data supplying operation stated in Steps 2 to 5, while if YES is the answer, the operation proceeds to the date-and-time determining operation stated in Step 1.

A more detailed description will be given with reference to an example shown in FIGS. 13 to 15.

On an assumption that the data collection is to be effected, for instance, six times a day, each collection time is set in advance, and when that time has arrived, the relay apparatus 2 sends a data A transfer request to the terminal equipment, as shown in FIG. 13. As a result, the terminal equipment transfers the data A stored in its storage means to the relay apparatus 2 at that point of time. The relay apparatus 2 adds the data A transferred thereto from the terminal equipment to the data stored previously in its storage means, and stores the same. As a result, one data transfer is completed. Then, the respective data B, D, N, and X are sequentially requested and transferred, but since the data A, B, D, and N need not be cleared, these data are stored in the storage means such as the memory 15 of the managing apparatus 3. However, since the data X for each copying operation needs to be cleared, a clear indication is sent, whereupon the managing apparatus clears the content of the storage means to zero in response to the clear indication. Thus, the data stored in the storage means of the managing apparatus are accumulated or cleared on each occasion of data transfer, and the data A, B, D, N, and X are sequentially added in the storage means of the relay apparatus 2, such as the RAM 32, and are stored therein.

Figure 14:
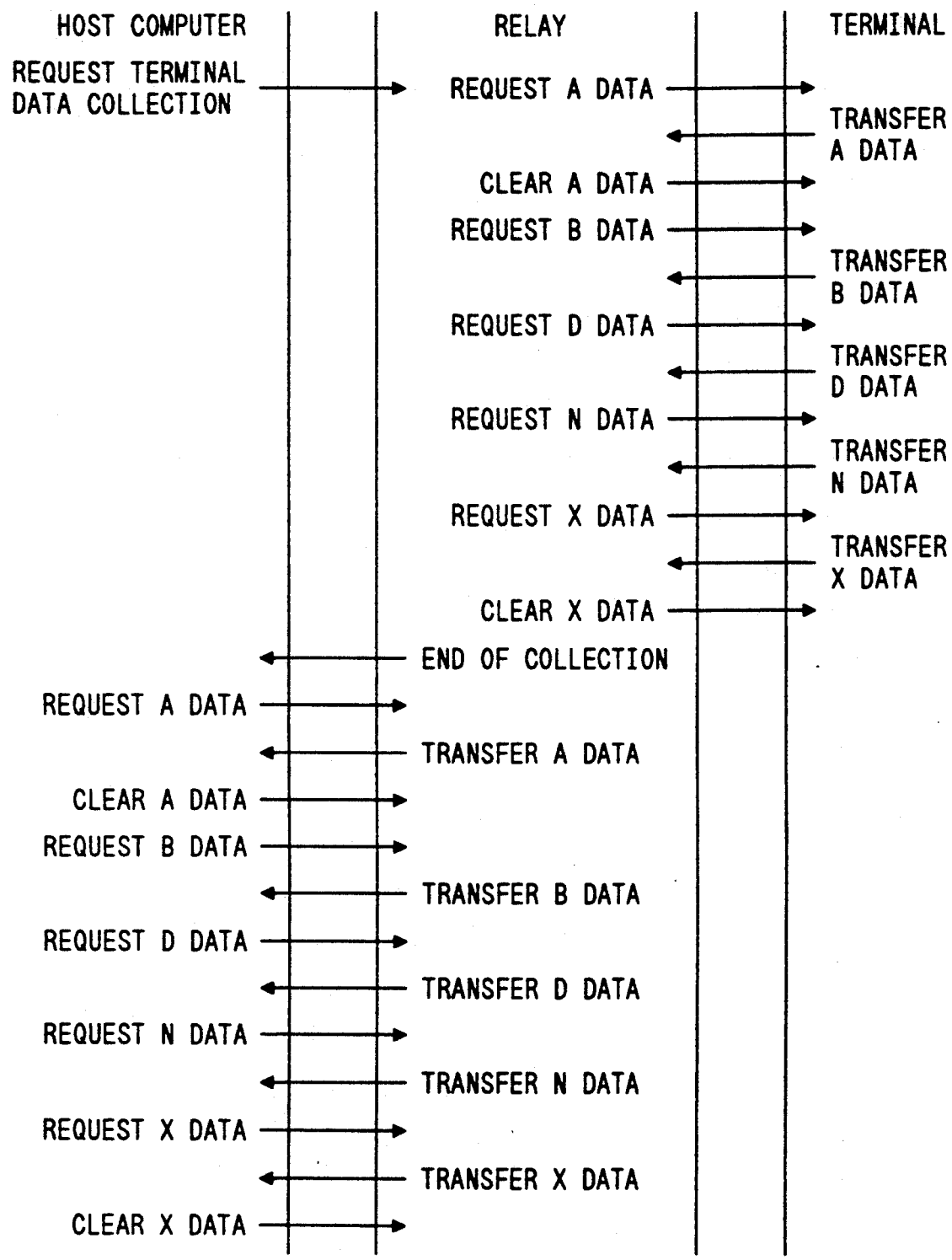
FIG. 14 is a diagram illustrating a method of transferring data among the host computer, the relay apparatus, and the terminal equipment.

In addition, as shown in FIG. 14, the data transfer request and transfer are effected among the host computer 41, the relay apparatus 2, and the managing apparatus 3 as follows.

On the assumption that the data collection is to be effected, for instance, six times a day, as described above each collection time is set in advance, and when that time has arrived, and if a data collection request has been made by the host computer 41 to the relay apparatus 2, the relay apparatus 2 issues a data A transfer request to the managing apparatus. As a result, the managing apparatus transfers the data A stored in its storage means to the relay apparatus 2 at that point of time. The relay apparatus 2 adds the data A transferred thereto from the managing apparatus to the data previously stored in its storage means, stores the same therein, and issues a data A clear indication to the managing apparatus. The managing apparatus clears the content of tis storage means to zero in response to that clear indication. As a result, one data transfer is completed. Then, the data B, d, N, and X are sequentially requested and transferred. Since the data B, D, and N need not be cleared, these data are accumulated in the storage means of the managing apparatus, but since the data A and X need to be cleared, a clear indication is issued, whereupon the managing apparatus clears the content of its storage means to zero in response to that clear indication. Thus, the data stored in the storage means of the managing apparatus are accumulated or cleared on each occasion of data transfer, and the data A, B, D, N, and X are sequentially added in the storage means of the relay apparatus 2, such as the RAM 32, and are stored therein.

In a case where a data collection request has been issued from the host computer 41 to the relay apparatus 2, the data A, B, D, N, and X are sequentially added in the storage means of the relay apparatus 2, such as the RAM 32, and are stored therein. When that operation is completed, a collection completed signal is issued from the relay apparatus 2 to the host computer 41. Then, a request for transferring the data A, B, D, N, and X is issued from the host computer 41. In response to that request, the data A, B, D, N, and X are transferred from the relay apparatus 2 to the host computer 41. It should be noted that, with respect to the data A and X, a clear indication is issued from the host computer to the relay apparatus, so that the data A and X are cleared to zero in the relay apparatus.

The host computer 41 issues a data transfer request to the relay apparatus 2 at the end of each day. As a result, the relay apparatus 2 transfers the data A, B, D, N, and X stored in the RAM 28 or the like to the host computer 41 at that point of time. Then, upon receiving the respective data from the relay apparatus 2 at the end of a month, the host computer 41 issues a clear indication to the relay apparatus 2 for the first time. In response to this clear indication, the relay apparatus 2 clears the content of the storage means such as the RAM 28 to zero.

That is, management data for one month is stored in the storage means of the relay apparatus 2 such as the RAM 28, and is cleared each month. For that reason, the host computer 41 retains the management data previously received from the relay apparatus 2, and a daily totalized value is obtained by subtracting the previous management data from the management data received from the relay apparatus 2. As for a monthly totalized value, the management data received from the relay apparatus 2 at the end of a month can be used as it is. It should be noted that in the event that the day's data collection was not effected by the host computer 41 for some reason or other, since the day's management data is set as the previous management data, the daily management data is set to zero.

Referring now to FIG. 15, a description will be given [of a data send notification and the sending operation of data between the host computer 41 and the high-order host computer 50.

When a data A send notification is issued from the host computer 41 to the high-order host computer 50, send OK is sent from the high-order host computer 50 to the host computer 41, and the data A is then sent from the host computer 41. Thereafter, the data B, D, and N are sent from the host computer 41 to the high-order host computer 50 in the same manner.

It should be noted that the supply of data from the host computer 41 to the high-order host computer 50 is effected on a supply day set in advance, as described above, and in the event that the supply date falls on a holiday, the data is changed to an immediately preceding or following date. Although this supply date may be set independently of the date of collection of data from the relay apparatus 2, the supply date may be set automatically on the basis of the data collection date.

Figure 16:
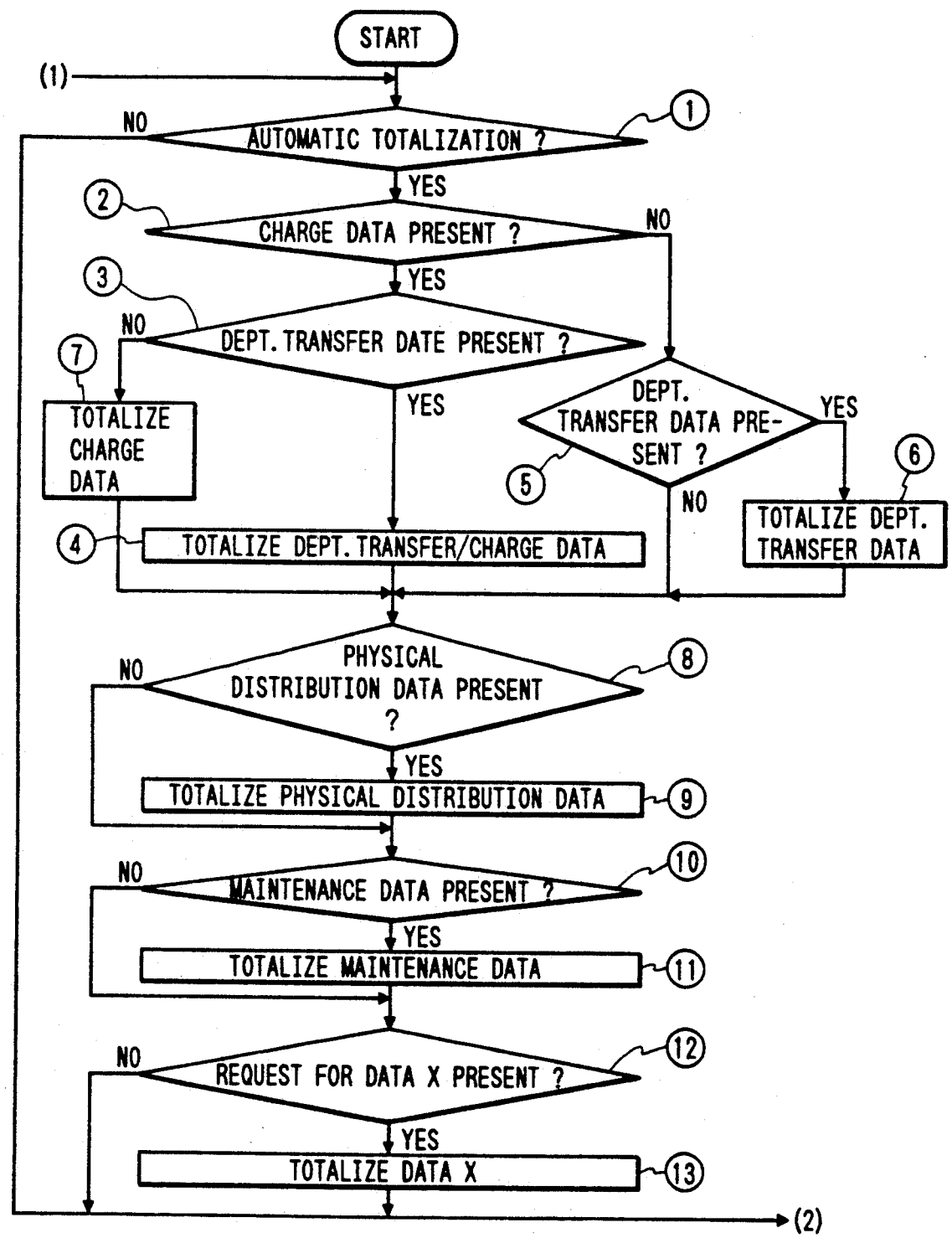
FIG. 16 is a flowchart illustrating the operation of automatic totalization of data.
Figure 17:
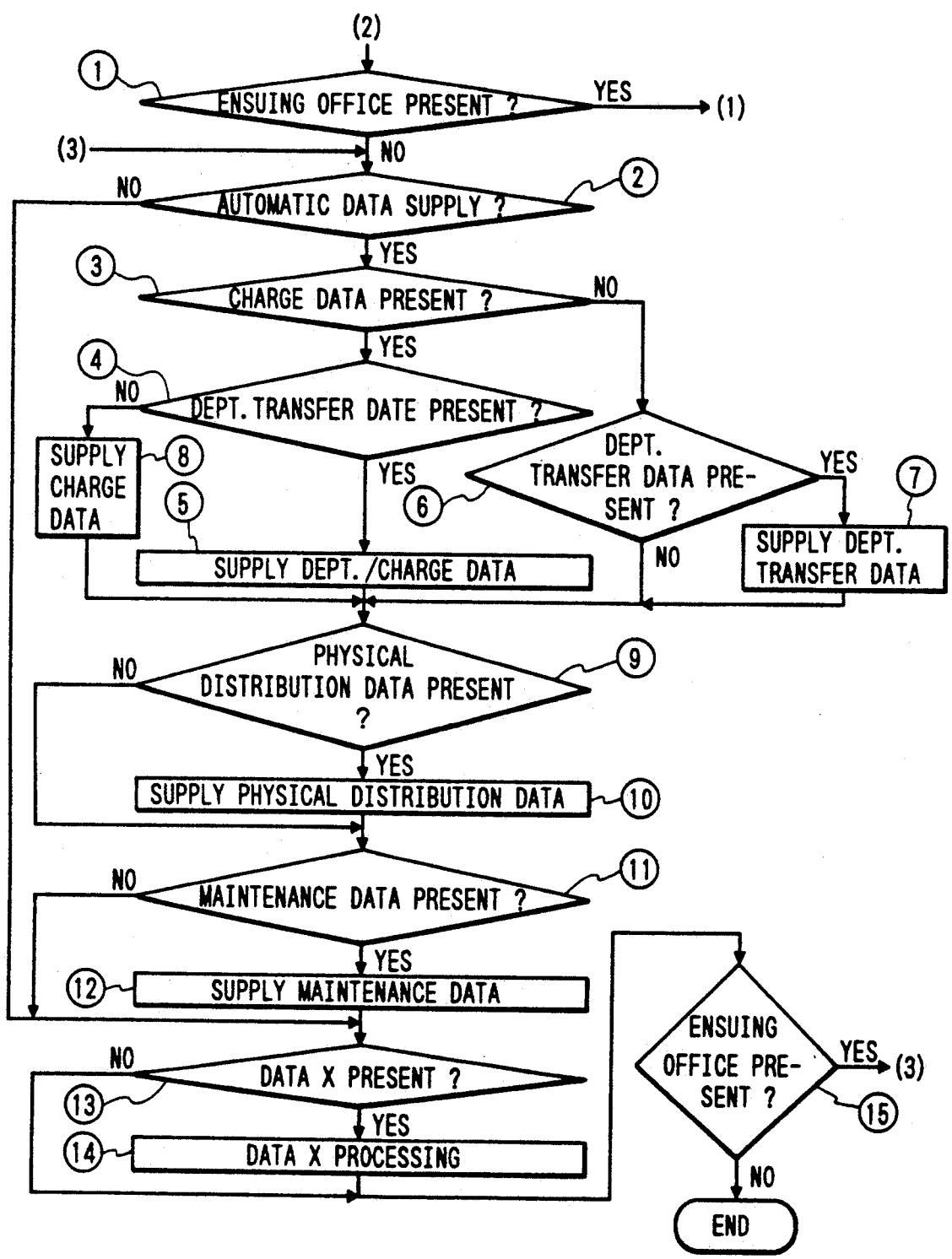
FIG. 17 is a flowchart illustrating the operation of automatic totalization of data.

Referring now to FIGS. 16 and 17, a description will be given of the operation of automatic totalization of management data by the host computer 41.

In Step 1 in FIG. 16, if it is determined that there has been an automatic totalization indication, a determination is made in Step 2 as to whether or not the charge data B is present. If YES is the answer, a determination is made in Step 3 as to whether or not the department account data A is present, and if YES is the answer, the operation of totalizing the department account data A and charge data B is effected in Step 4. On the other hand, if it is determined in Step 2 that the charge data B is not present, a determination is made in Step 5 as to whether or not the department account data A is present, and if YES is the answer, the totalization of the department account data A is effected in Step 6. Furthermore, if it is determined in Step 3 that the department account data is not present, the totalization of the charge data B is effected in Step 7.

Then, in Step 8, a determination is made as to whether or not there has been a request for the physical distribution data D, and if YES is the answer, the totalization of physical distribution data is effected in Step 9. Subsequently, a determination is made in Step 10 as to whether or not there has been a request for the maintenance data N, and if YES is the answer, the maintenance data N is totalized in Step 11. Then, a determination is made in Step 12 as to whether or not there has been a request for the data X, and if YES is the answer, the data X is totalized. If it is determined in Steps 8, 10, and 12 that NO is the answer, respectively, the operation proceeds to following steps of determination. The operation in the aforementioned Steps 1 to 11 is effected in units of terminal equipment, and the operation stated in Steps 1 to 13 is effected in units of offices.

Then, in Step 1 shown in FIG. 17, a determination is made as to whether or not there has been an automatic totalization indication for an ensuing office. If YES is the answer, the processing returns to the processing start operation described in the part (1) of FIG. 16. Meanwhile, if it is determined in Step 1 in FIG. 17 that NO is the answer, a determination is made as to whether or not there has been an automatic data supply indication, and if YES is the answer, a determination is made as to whether or not the charge data B is present. If YES is the answer, a determination is made as to whether or not the department account data A is present, and if YES is the answer, the supply of the department account data A and the charge data B is effected (see Steps 2 to 5). In addition, if it is determined in Step 3 that the charge data B is not present, a determination is made as to whether or not the department account data A is present, and if YES is the answer, the department account data is supplied in Step 7. Meanwhile, if it is determined in Step 4 that the data A is not present, the charge data is supplied in Step 8. Furthermore, a determination is made in Step 9 as to whether or not the physical distribution data D is present, and if YES is the answer, the physical distribution data is supplied in Step 10. Subsequently, a determination is made as to whether or not the maintenance data N is present, and if YES is the answer, the maintenance data is supplied. Then, a determination is made as to whether or not the data X is present, and if YES is the answer, the data X is supplied. Then, a determination is made as to whether or not there has been an automatic totalization indication for an ensuing office, and if NO is the answer, the operation ends, while if YES is the answer, the operation proceeds to Step 2 (see Steps 11 to 15).

To identify the model numbers of the copying machines, it is necessary to register the machine model codes in the managing apparatuses 3-1 to 3-N in advance. To register the machine model codes, however, since the managing apparatuses are provided with only a numeric keypad, only numerals can be inputted. However, since the information on charges to offices for each copying machine is managed by commodity codes (alphanumeric characters), the conventional practice has been such that the operator converts the machine model code to a commodity code while referring to a code table in the operation headquarters. In addition, if the multiplicity of managing apparatuses are respectively provided with a keyboard for inputting alphanumeric characters, the cost becomes high. Accordingly, in this embodiment, the host computer 41 is provided with the function of converting the machine mode codes to the commodity codes. That is, in the host computer 41, a code collation table in which the commodity codes have been registered in correspondence with the machine model codes is connected to the CPU 42 and the RAM 49 in advance, and the CPU 42 is provided with the code converting function for converting the machine model codes to the commodity codes.

As such, with reference to FIGS. 18 to 20, a description will be given of the operation of commodity code information in the case where such a code converting function is provided.

Figure 18:
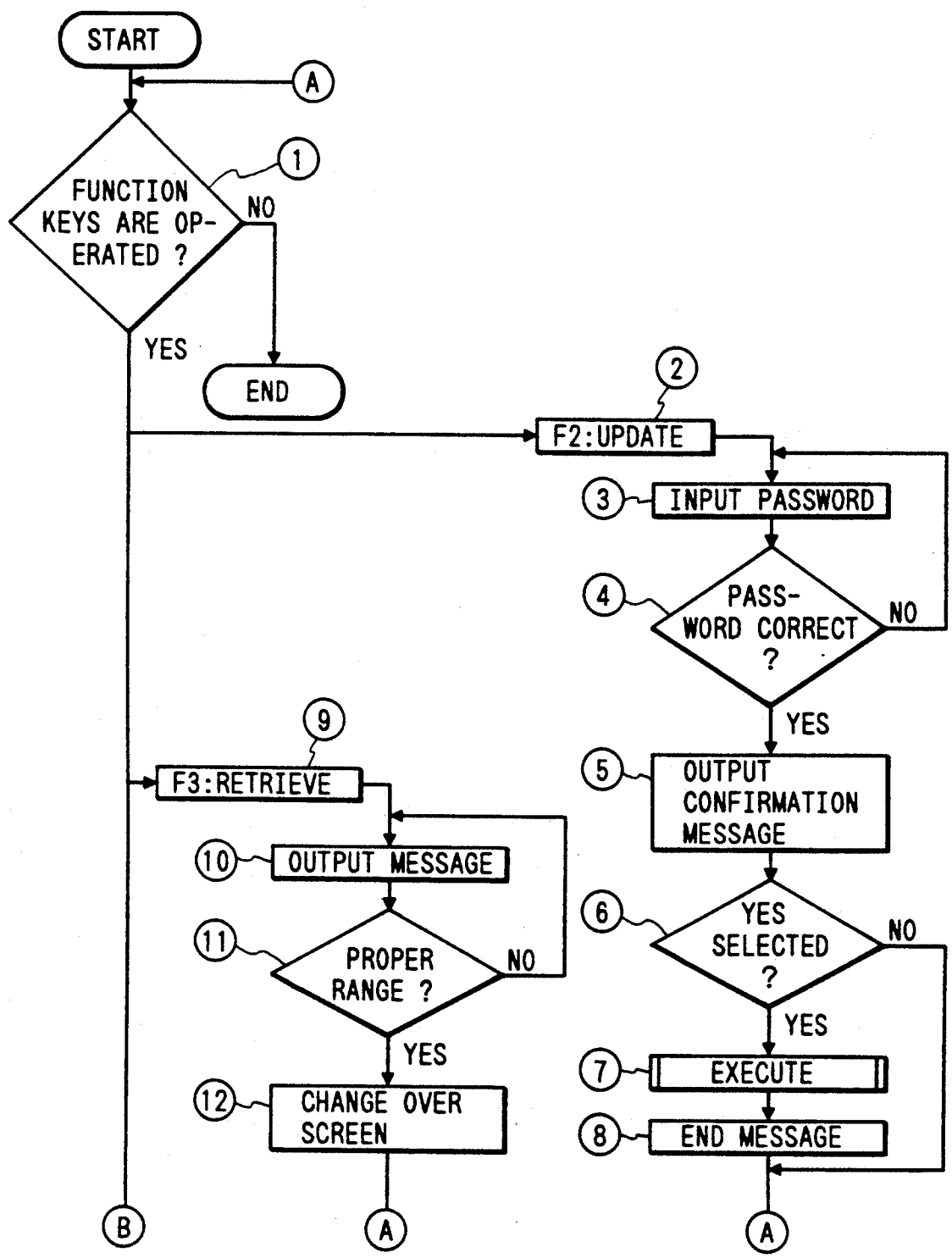
FIG. 18 is a flowchart illustrating the operation of handling commodity code information.

In Step 1 in FIG. 18, when an update function key F2 is operated in Step 2 to obtain an updated menu after one of the function keys F on the keyboard 43 of the host computer 41 has been pressed in Step 1, and if in this state an operator's password is entered by a key in Step 3, in Step 4 a determination is made by the CPU 42 as to whether or not the password is correct, and if correct, a confirmation message is outputted in Step 5. Then, if YES is selected in Step 6, the machine model codes and the commodity codes are updated in accordance with the index in Step 7, and if an end message is displayed in Step 8, the operation proceeds to Step 1.

In addition, if a retrieval key F3 is operated in Step 9, an instruction for inputting the index is displayed as a message, and a determination is made as to whether the subsequently inputted items are proper, and if YES is the answer, a screen changeover operation is effected. (Steps 10 to 12).

Figure 19:
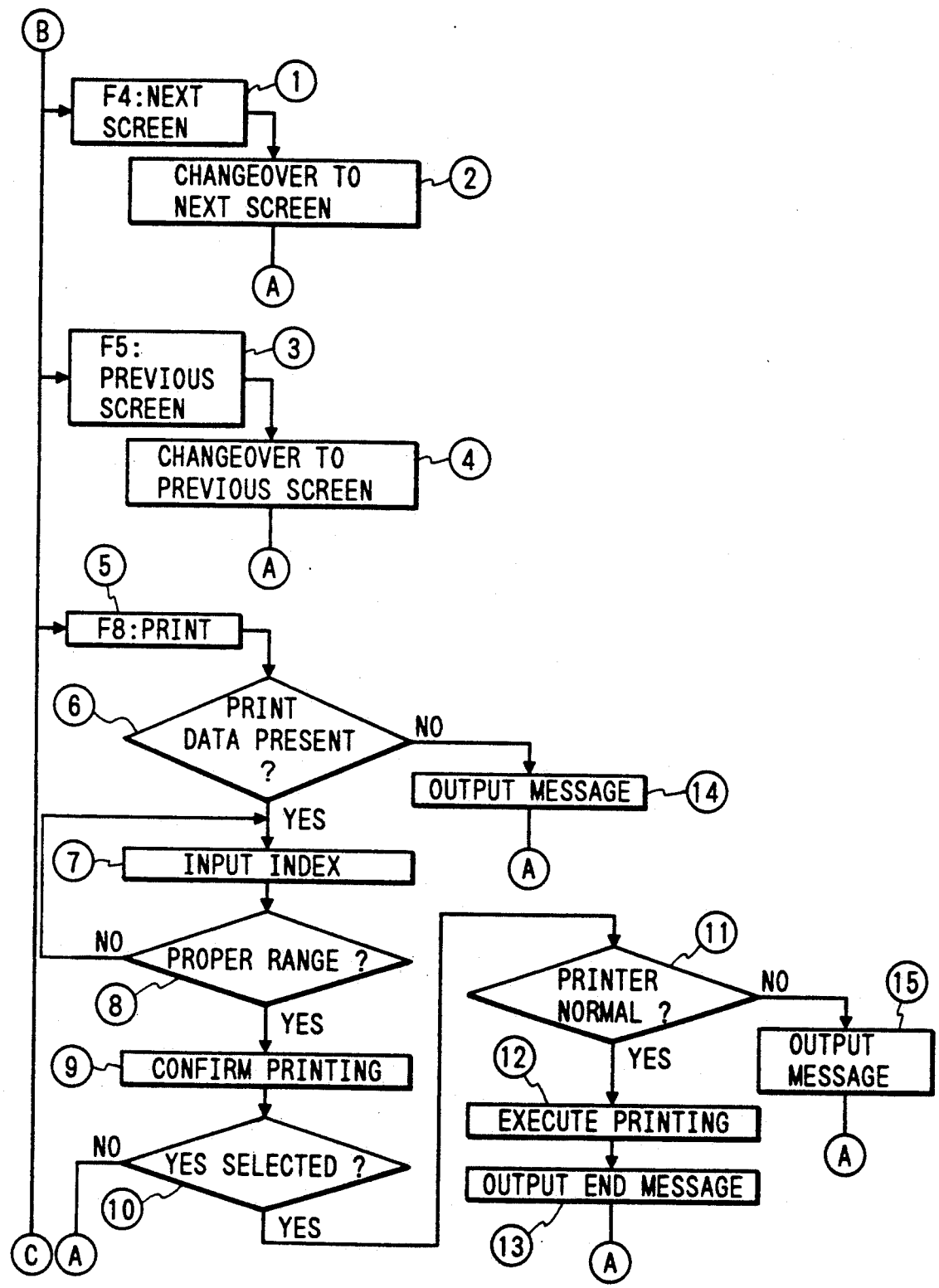
FIG. 19 is a flowchart illustrating an operation continuing from the one shown in FIG. 18.

If a next screen key F4 is operated in Step 1 in FIG. 19, a changeover to a next screen is effected in Step 2. Similarly, a changeover to a previous screen is effected through Steps 3 and 4 by means of a previous screen key F5.

If a print key F8 is operated in Step 5, a determination is made in Step 6 as to whether or not print data is present. If YES is the answer, the index is inputted in Step 7, and a determination is made as to whether or not the input range is proper. If YES is the answer, a print confirmation operation is effected in Step 9, and if NO is selected, the operation proceeds to Step 1 in FIG. 18, while if YES is selected, a determination is made in Step 11 as to whether or not the printer 45 is normal. If YES is the answer, printing is executed in Step 12, and an end message is subsequently displayed, and the operation proceeds to Step 1 in FIG. 18. Meanwhile, if NO is the answer in Step 11, a printer abnormal message is displayed before the operation proceeds to Step 1 in FIG. 18.

Figure 20:
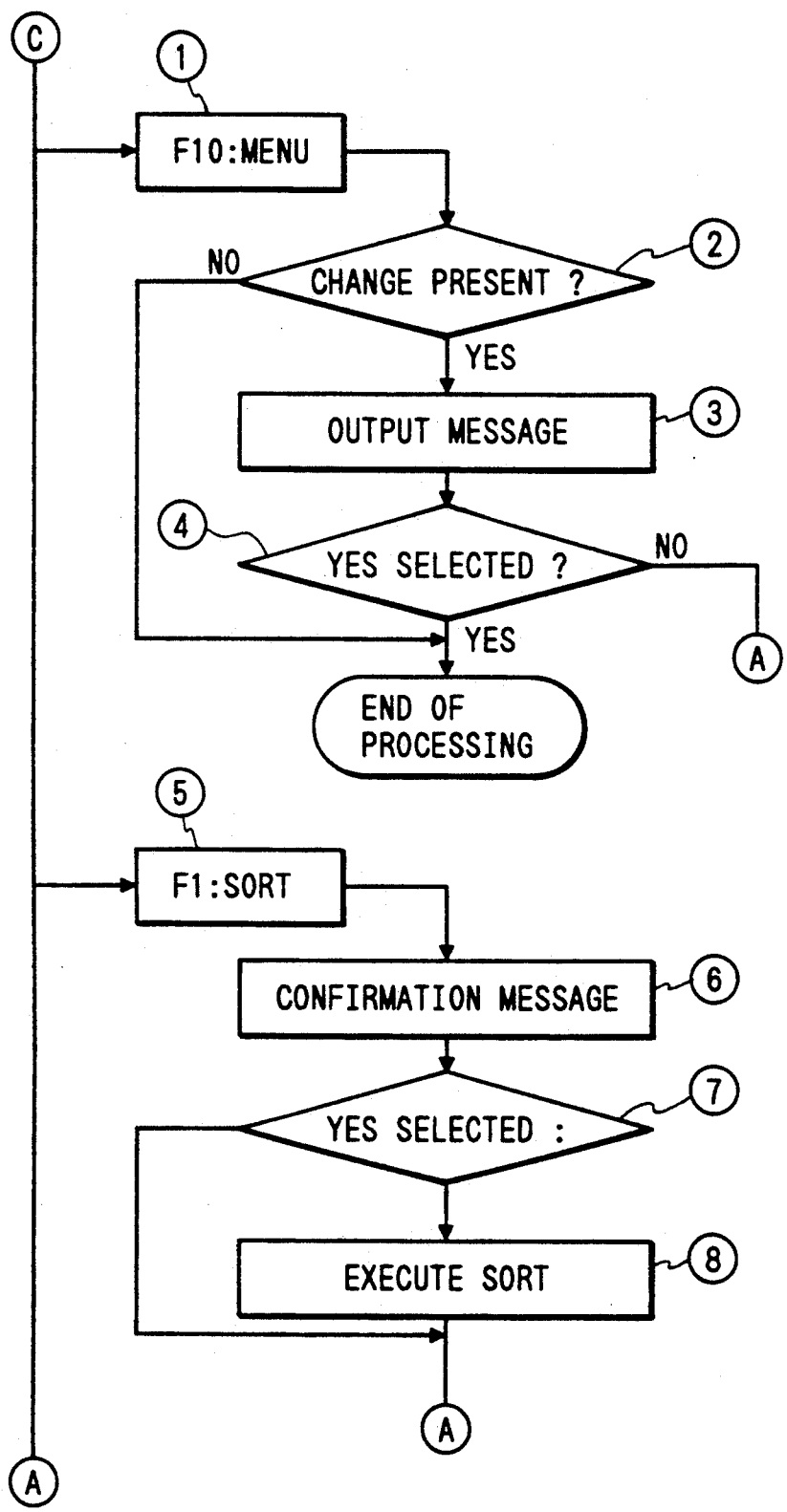
FIG. 20 is a flowchart illustrating an operation continuing from the one shown in FIG. 19.

Furthermore, if a menu key F10 is operated in Step 1 in FIG. 20, a determination is made in Step 2 as to whether or not there has been any change in the machine model codes and the commodity codes, and if YES is the answer, that message is displayed in Step 3. If YES is selected in Step 4, the processing ends. Meanwhile, if NO is selected in that step, the operation proceeds to Step 1 in FIG. 18.

If a sort key F1 is operated in Step 5 in FIG. 20, a confirmation message is displayed in Step 6, and if YES is selected in Step 7, the machine model codes and the commodity codes are sorted in Step 8. Subsequently, the operation proceeds to Step 1 in FIG. 18.

It is possible to provide the host computer 41 shown in FIG. 3 with the function of detecting abnormalities for each type of error in the event that abnormalities have occurred such as an abnormality in the communication line, an abnormality in the machine model code, an abnormality in the collected data, and an abnormality in overflowing memory, and allowing the printer 45 to print an error message. A description will be given of this error detection and printing operation with reference to FIG. 21.

Figure 21:
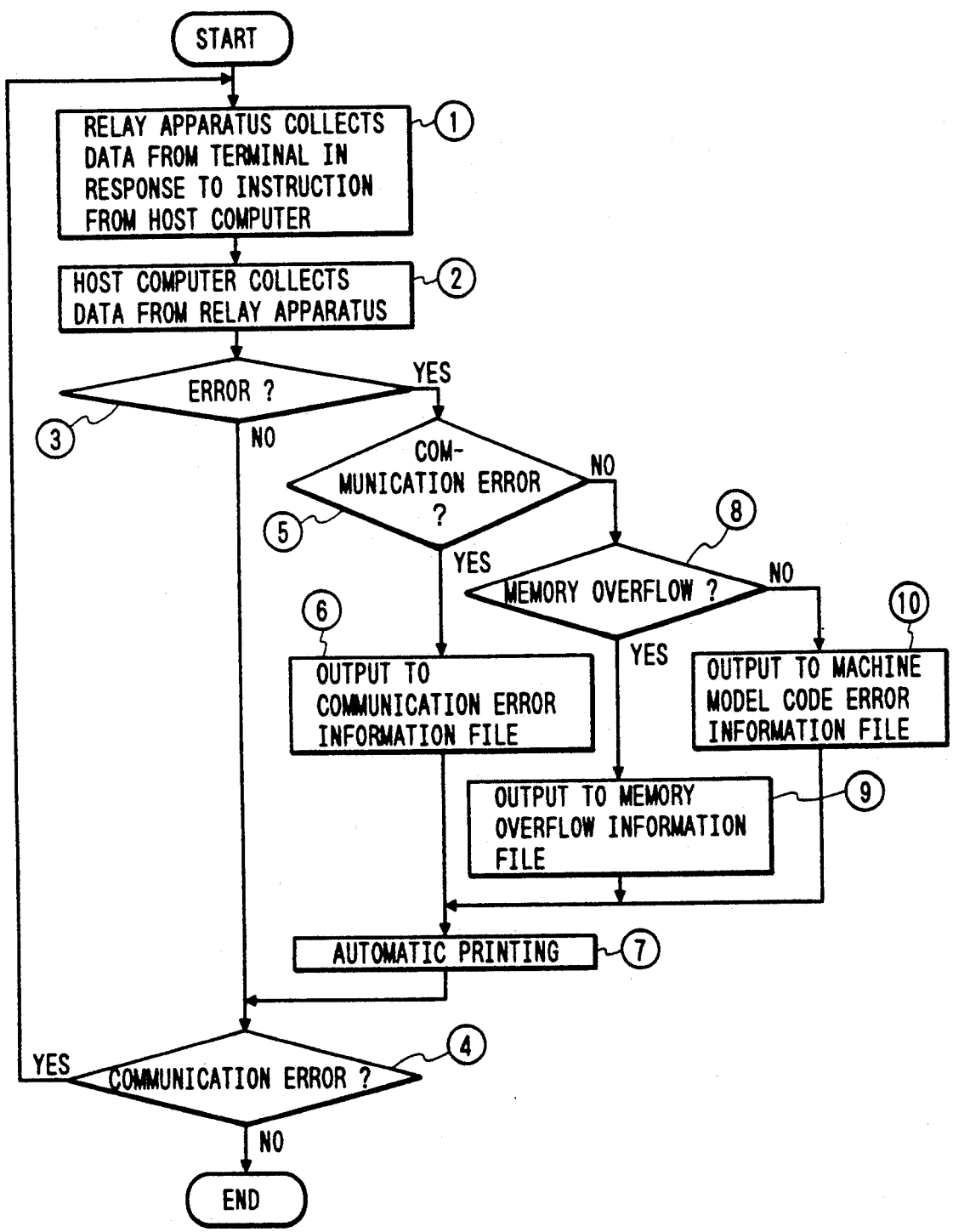
FIG. 21 is a diagram illustrating the operation executed when an error has occurred in the process of collecting data.

In Step 1, in FIG. 21, the relay apparatus 2 collects data from the managing apparatus in response to an instruction from the host computer 41. Then, in Step 2, the host computer 41 collects data from the relay apparatus 2. Subsequently, a determination is made in Step 3 as to whether or not there has been an error in the data collection process, and if NO is the answer, a determination is made in Step 4 as to whether or not a communication error has occurred. If YES is the answer in Step 4, the processing returns to the operation stated in Step 1, while if NO is the answer, the processing ends.

On the other hand, if it is determined in Step 3 that there has been an error, a determination is made in Step 5 as to whether or not it is a communication error, and if YES is the answer, a communication error is outputted to the communication error information file in Step 6. Subsequently, in Step 7, the communication error information is automatically printed by the printer 45, and the processing proceeds to the operation stated in Step 4.

Furthermore, if it is determined in Step 5 that the information is not communication error information, a determination is made in Step 8 as to whether or not the memory has overflown, and if YES is the answer, an overflow error is outputted to the memory overflow information file, and the processing proceeds to the printing operation stated in the aforementioned Step 7. Then, if it is determined in the aforementioned Step 8 that it is not a memory overflow, a machine model code error is outputted to the information file in Step 10, and the processing proceeds to the printing operation stated in Step 7.

In addition, an arrangement may be alternatively provided such that the contents of abnormalities in the communication line are represented by codes and are displayed on the screen or printed out automatically.

Furthermore, an arrangement may be provided such that in the event that an abnormality in the communication line has occurred, a retry may be made through keying or automatically.

If an error has thus occurred, the type of error can be discriminated and printed out automatically, the number of steps required in coping with the trouble can be reduced substantially.

As described above, the host computer 41 is provided with the monthly totalization files 74 for accumulating management data for a plurality of months in units of months, and the annual totalized data can be outputted by the annual totalization processing unit 75 on the basis of this data. In an arrangement in which the closing date cannot be set arbitrarily, however, the annual totalization is possible only for fixed monthly units (1st day to final day). Additionally, the monthly totalization can be effected only once during a set month.

Figure 22:
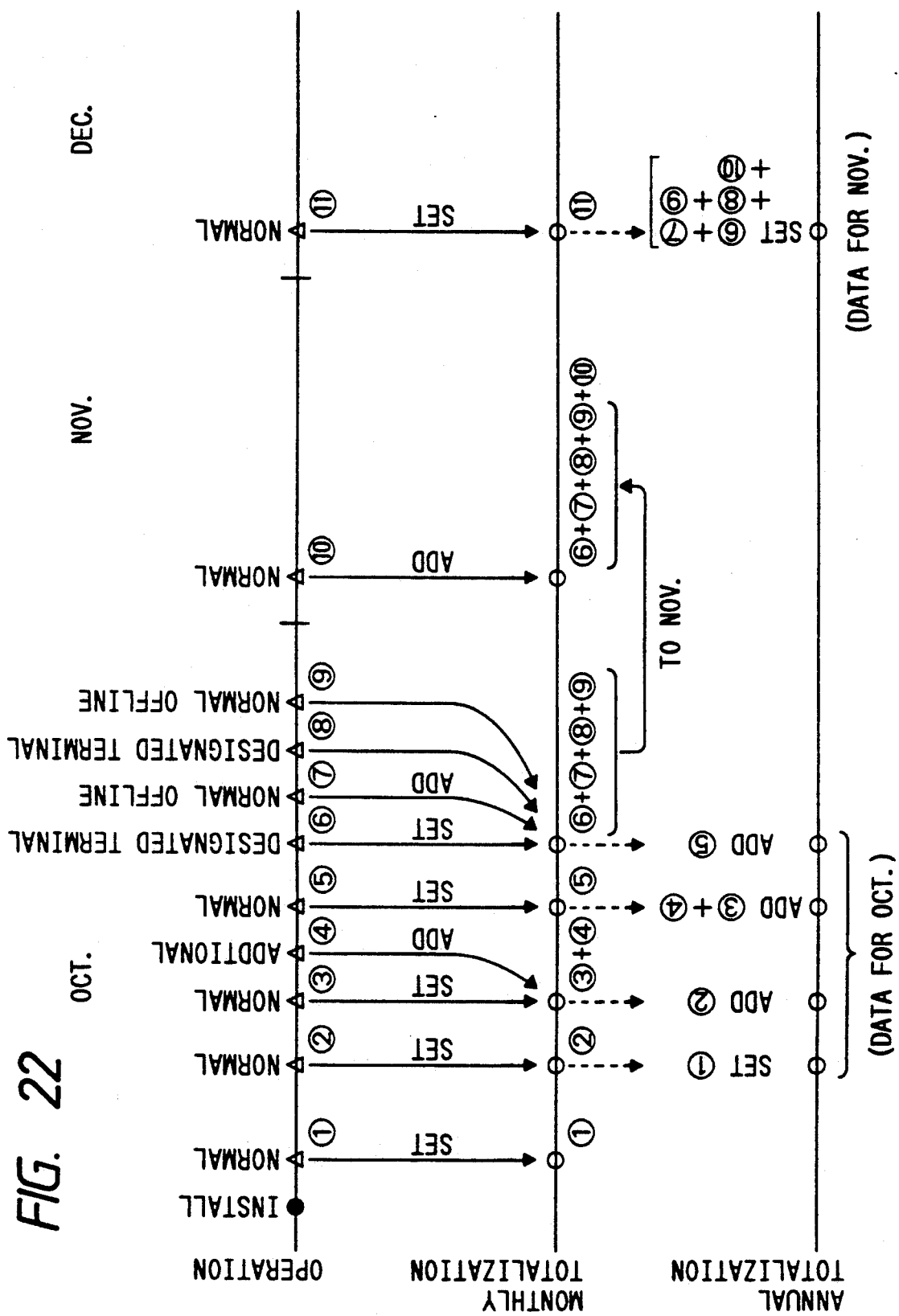
FIG. 22 is a diagram illustrating a specific example of a period totalization operation.

Accordingly, it is conceivable to provide the host computer 41 with a function whereby the closing day of a month can be registered arbitrarily. In this case, since the closing date cay be set arbitrarily, an annual totalization intended by the operator can be obtained. In addition, it is also possible to provide the host computer 41 with a function whereby the annual totalization can be effected up to a closing day registered in advance. Furthermore, the host computer 41 may be provided with the function of conducting the monthly totalization a plurality of times within a month, or the function of automatically setting all the monthly totalized data in the case of the first month and adding the same thereafter, or automatically effecting the monthly or annual totalization such as by setting or adding the previous normal monthly totalized data to the annual totalized file for that month in the event that the normal monthly totalization is effected on a closing day of the month. A specific example of such a totalization operation is shown in FIG. 22. In FIG. 22 and FIGS. 23 to 25, the normal monthly totalization is referred to as "NORMAL MONTH," the additional monthly totalization as "ADDITIONAL MONTH," the specified terminal monthly totalization simply as "DESIGNATED TERMINAL," and the normal office totalization as "NORMAL OFFLINE," respectively.

Figure 23:
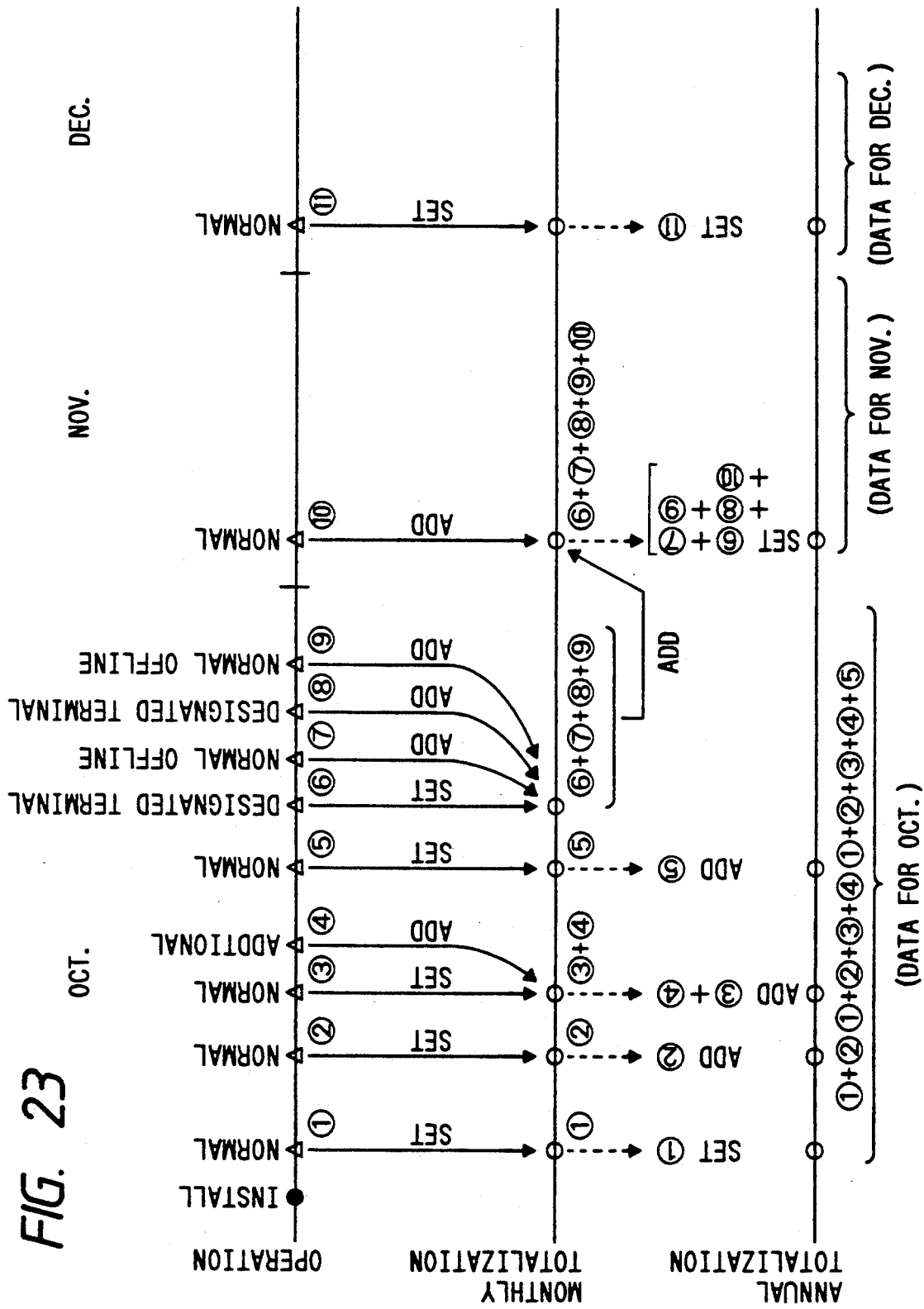
FIG. 23 is a diagram illustrating another specific example of the period totalization operation.
Figure 24:
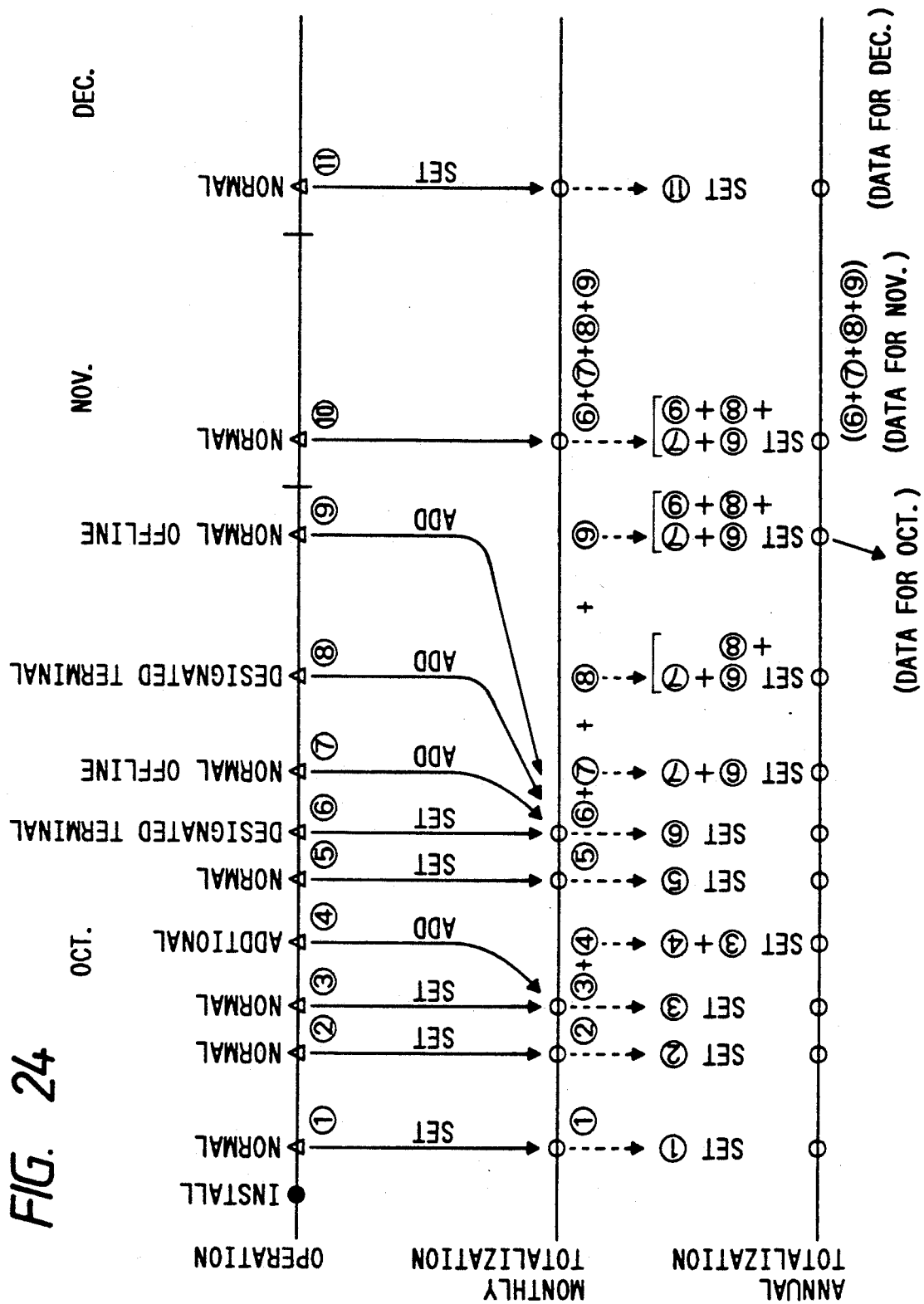
FIG. 24 is a diagram illustrating still another specific example of the period totalization operation.

In addition, an arrangement may be alternatively provided such that after the normal monthly totalization has been effected, that monthly data is set or added in the monthly totalization file 74 and the annual totalization file 76 so as to effect the annual totalization and monthly totalization simultaneously. Furthermore, after the normal monthly totalization is effected, that monthly data may first be set or added in the normal monthly totalization file, and the data in the normal monthly totalization file may then be set in the annual totalization file. These specific examples are shown in FIGS. 23 and 24.

Figure 25:
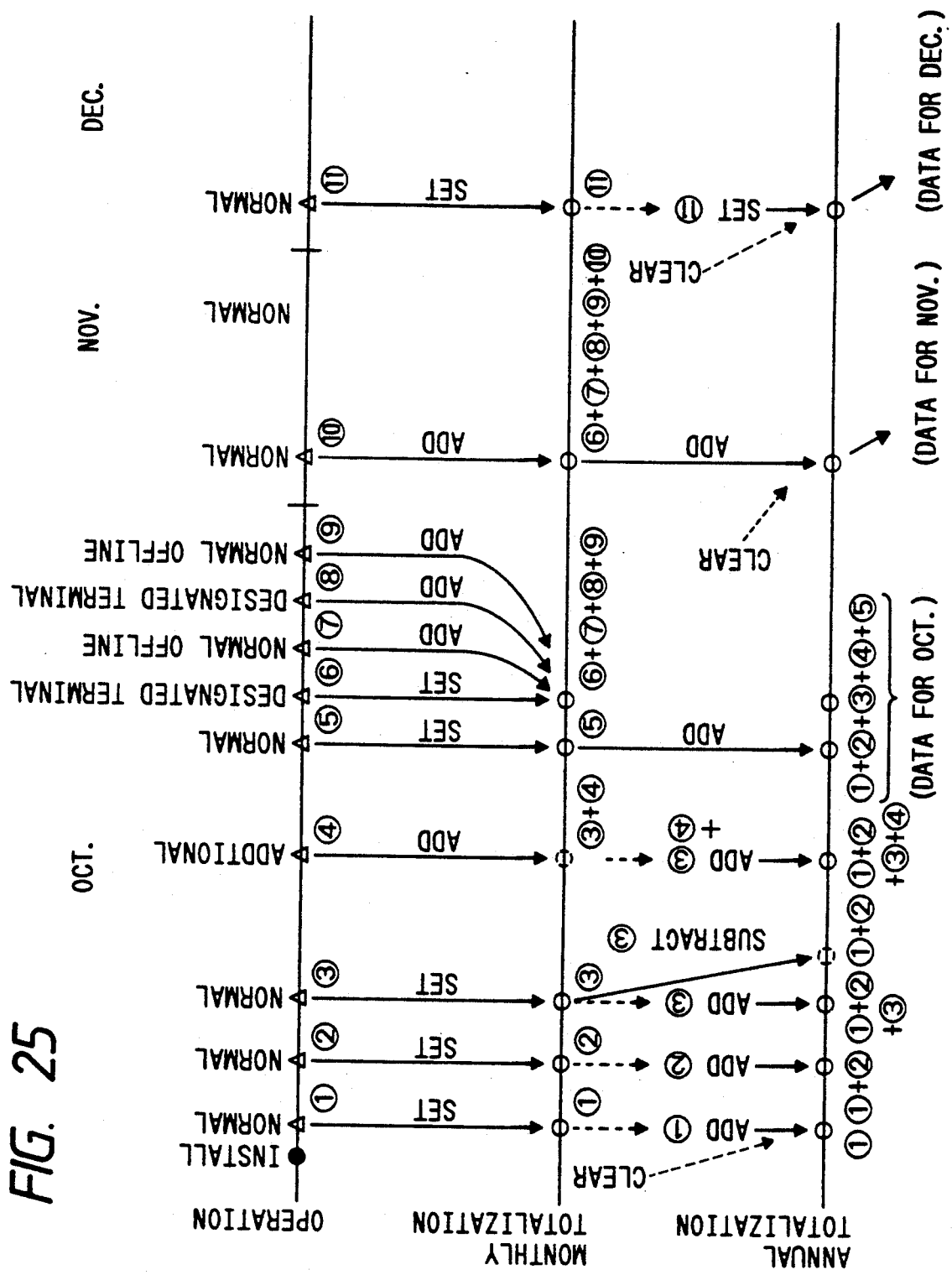
FIG. 25 is a diagram illustrating a further example of the period totalization operation.

As a basic method of annual totalization, a method is adopted in which the monthly totalized result is added in the annual totalization file for that month. At the time of an initial monthly totalization for a given month, the annual totalization file for that month is cleared before the monthly totalized result is calculated, thereby erasing the previous year's data. In addition, at the time of an additional monthly totalization, after the present monthly totalized result is subtracted from the annual totalization file for that month, an additional monthly totalization is effected and is added in the annual totalization file, thereby preventing the double addition of the monthly totalized result. This specific example is shown in FIG. 25.

It should be noted that the present invention is not restricted to the above-described embodiment, and may be embodied as follows.

(1) An arrangement may be provided such that in a case where a collection date has been set by the host computer 41, the date of automatically collecting data is changed to a certain date preceding or following a holiday.

(2) Although in the foregoing embodiment the date of collection of data and the day of the week thereof are set through the keyboard 43, an arrangement may be provided such that a determination is made by the calendar table 47 of the host computer 41 as to whether or not the set collection date falls on a holiday.

As described above, in accordance with the first aspect of the invention, in the event that a management data collection day set by a host computer on the master station's side falls on a holiday on the terminal station's side, the host computer collects management data from the relay apparatus by avoiding that holiday, so that thee is an advantage in that the totalization can be effected reliably.

In addition, in accordance with the second aspect of the invention, in addition to the advantage obtained in the first aspect of the invention, there is an advantage in that the management data collected by the host computer from the relay apparatus can be automatically supplied to a high-order host computer.

What is claimed is:

1. A recording apparatus managing system comprising:
at least one terminal station including managing means for managing data including information as to the use of a plurality of recording means installed on said terminal station, a relay means connected to said managing means to collect and hold the management data from said managing means at a set time;
a master station including a first host operation means connected respectively to said relay means through a data network to effect data processing, said first host operation means including collection-date setting means for setting a date of collection of the management data held by said relay means, automatic collection means for automatically collecting the management data held by said relay means on the collection day set in advance by said collection-date setting means, means for determining whether the set date falls on a predetermined day, and means for operating said automatic collecting means on a day other than the predetermined day in response to an output of said determining means.

2. The system as defined in claim 1 wherein the predetermined day is at least one holiday, the holiday being stored in a memory means of said master station in advance.

3. The system as defined in claim 1 wherein said operating means causes said automatic collecting means to collect the management data on a preceding day of the predetermined day.

4. The system as defined in claim 1 wherein said operating means causes said automatic collecting means to collect the management data on the following day of the predetermined day.

5. The system as defined in claim 1 wherein the data processing comprises the collection of the management data held by said relay means, totalization calculation, and charge calculation.

6. The system as defined in claim 1 further comprising a second operating means connected to said first operating means via the data network to receive the management data on a predetermined supply day set by said first operating means, wherein said first operating means further comprises an automatic supply means for automatically supplying the collected management data from said first operating means to said second operating means on the predetermined supply day set in advance.

7. The system as defined in claim 1 wherein said managing data comprises physical distribution data, maintenance data, and data representing the conditions of use.

8. The system as defined in claim 7 wherein said physical distribution data comprises at least one of department account data, charge data based on count meters of copying machine and data on the number of copies made per type of paper in each copying machine; said maintenance data comprises at least one of data on the number of toner replenishment, data on the number of jamming, data on the starting time and ending time of use for each day, and data on the number of operations; and said data representing the conditions of use comprises data totalizing the amounts of the conditions of use including the details of use for each copying operation: the paper size, the use of black-and-white, full-color, black-and-white tracing paper, or monocolor printing, the type of copy mode, optional functions of the double-sided/multiplex copying, plate making for a printing machine, reduced copy, and edited or synthesized copy.

* * * * *